United States Patent
Kim

(10) Patent No.: US 10,085,217 B2
(45) Date of Patent: Sep. 25, 2018

(54) MOBILE TERMINAL AND METHOD FOR CONTROLLING THE SAME

(71) Applicant: LG ELECTRONICS INC., Seoul (KR)

(72) Inventor: Hyunmin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/282,292

(22) Filed: Sep. 30, 2016

(65) Prior Publication Data

US 2017/0099638 A1 Apr. 6, 2017

(30) Foreign Application Priority Data

Oct. 1, 2015 (KR) .................. 10-2015-0138656

(51) Int. Cl.
| | |
|---|---|
| *H04M 1/725* | (2006.01) |
| *H04M 1/663* | (2006.01) |
| *H04W 52/02* | (2009.01) |
| *H04W 68/02* | (2009.01) |
| *H04L 12/26* | (2006.01) |
| *G06F 3/0481* | (2013.01) |
| *G06F 3/0484* | (2013.01) |

(52) U.S. Cl.
CPC ......... *H04W 52/0261* (2013.01); *H04L 43/16* (2013.01); *H04W 52/0216* (2013.01); *H04W 68/02* (2013.01); *G06F 3/04817* (2013.01); *G06F 3/04842* (2013.01)

(58) Field of Classification Search
CPC .............................. G08B 21/182; H04W 24/00
USPC .................. 455/566, 343.1, 343.4, 412.2
See application file for complete search history.

(56) References Cited

U.S. PATENT DOCUMENTS

| | | | | |
|---|---|---|---|---|
| 7,825,818 | B2 * | 11/2010 | Yoon ........... | H04H 20/426 340/636.1 |
| 9,070,273 | B2 * | 6/2015 | Lombardi ...... | G08B 21/182 |
| 9,818,289 | B2 * | 11/2017 | Tan ............. | G06F 1/3287 |
| 2005/0268131 | A1 * | 12/2005 | Matsunobu ..... | G06F 1/28 713/323 |
| 2008/0129521 | A1 * | 6/2008 | Yoon ........... | H04H 20/426 340/636.1 |
| 2008/0201587 | A1 * | 8/2008 | Lee ............ | G06F 1/3203 713/320 |
| 2009/0187780 | A1 * | 7/2009 | Keohane ....... | G06F 1/3203 713/324 |
| 2010/0063756 | A1 | 3/2010 | Agrawal et al. | |
| 2010/0151918 | A1 | 6/2010 | Annambhotla et al. | |
| 2011/0071780 | A1 | 3/2011 | Tarkoma | |

(Continued)

FOREIGN PATENT DOCUMENTS

EP 2760188 A1 7/2014

*Primary Examiner* — Edward Urban
*Assistant Examiner* — Rui Hu
(74) *Attorney, Agent, or Firm* — Birch, Stewart, Kolasch & Birch, LLP

(57) ABSTRACT

A mobile terminal including a wireless communication unit configured to provide wireless communication; a display; a battery configured to supply power to the mobile terminal; and a controller configured to measure a remaining charge of the battery, measure an available time of the battery based on the measured remaining charge of the battery and a load of the mobile terminal, and output a predetermined pre-notice event when an upcoming scheduled event is present after the available time.

18 Claims, 21 Drawing Sheets

(56) References Cited

U.S. PATENT DOCUMENTS

| | | | |
|---|---|---|---|
| 2011/0080422 A1* | 4/2011 | Lee | G06F 1/3203 |
| | | | 345/589 |
| 2012/0117507 A1* | 5/2012 | Tseng | H04M 1/72552 |
| | | | 715/774 |
| 2012/0254634 A1 | 10/2012 | Chakra et al. | |
| 2013/0227318 A1 | 8/2013 | Musial et al. | |
| 2013/0329527 A1* | 12/2013 | Alavala | H04W 4/02 |
| | | | 368/10 |
| 2014/0075234 A1 | 3/2014 | Stekkelpak et al. | |
| 2014/0203944 A1* | 7/2014 | Lombardi | G08B 21/182 |
| | | | 340/636.1 |
| 2014/0302833 A1* | 10/2014 | Jin | H04W 4/16 |
| | | | 455/417 |
| 2015/0212918 A1* | 7/2015 | Cai | H04W 52/0251 |
| | | | 719/318 |

* cited by examiner

MOBILE TERMINAL AND METHOD FOR CONTROLLING THE SAME

CROSS-REFERENCE TO RELATED APPLICATION

This application claims priority to Korean Patent Application No. 10-2015-0138656 filed on Oct. 1, 2015 in Korea, the entire contents of which is hereby incorporated by reference in its entirety.

BACKGROUND OF THE DISCLOSURE

1. Field of the Disclosure

The present invention relates to a mobile terminal and a method for controlling the same and, more particularly, to a mobile terminal for pre-notifying a user of information on a preset scheduled event or alarm when a remaining battery power is insufficient, and a method for controlling the same.

2. Background of the Disclosure

Terminals may be generally classified as mobile/portable terminals or stationary terminals. Mobile terminals may also be classified as handheld terminals or vehicle mounted terminals.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs. Efforts are ongoing to support and increase the functionality of mobile terminals. Such efforts include software and hardware improvements, as well as changes and improvements in the structural components.

A mobile terminal also provides a schedule application for managing a user schedule. In addition, the mobile terminal provides an alarm application supporting an alarm function or a wake-up call function. However, if a mobile terminal is powered off due to exhaustion of a battery in a state of setting a schedule or alarm function, the user of the mobile terminal may not recognize that the mobile terminal is powered off, thereby missing an important event or alarm. Accordingly, when the remaining battery power (i.e. a remaining charge of the battery) is insufficient, a service for pre-notifying the user of a major event and alarm needs to be provided.

SUMMARY OF THE DISCLOSURE

Accordingly, an object of the present invention is to address the above-noted and other problems.

Another object of the present invention is to provide a mobile terminal for providing information on a preset scheduled event or alarm using various methods according to the state of a battery, when a remaining battery power is insufficient, and a method for controlling the same.

To achieve these and other advantages and in accordance with the purpose of the present invention, as embodied and broadly described herein, the disclosure provides in one aspect a mobile terminal including a power supply unit configured to supply power to a terminal system; and a controller configured to measure a remaining charge of a battery included in the power supply unit, to measure an available time of the battery based on the measured remaining charge of the battery and a load of the terminal system and to generate a predetermined pre-notice event when a scheduled event is present after the available time.

In another aspect, the present invention provides a method for controlling a mobile terminal including measuring a remaining charge of a battery, measuring an available time of the battery based on the measured remaining charge of the battery and a load of the terminal system, and generating a predetermined pre-notice event when a scheduled event is present after the available time.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein.

DETAILED DESCRIPTION OF THE PREFERRED EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although the terms first, second, etc. may be used herein to describe various elements, these elements should not be limited by these terms. These terms are generally only used to distinguish one element from another. When an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
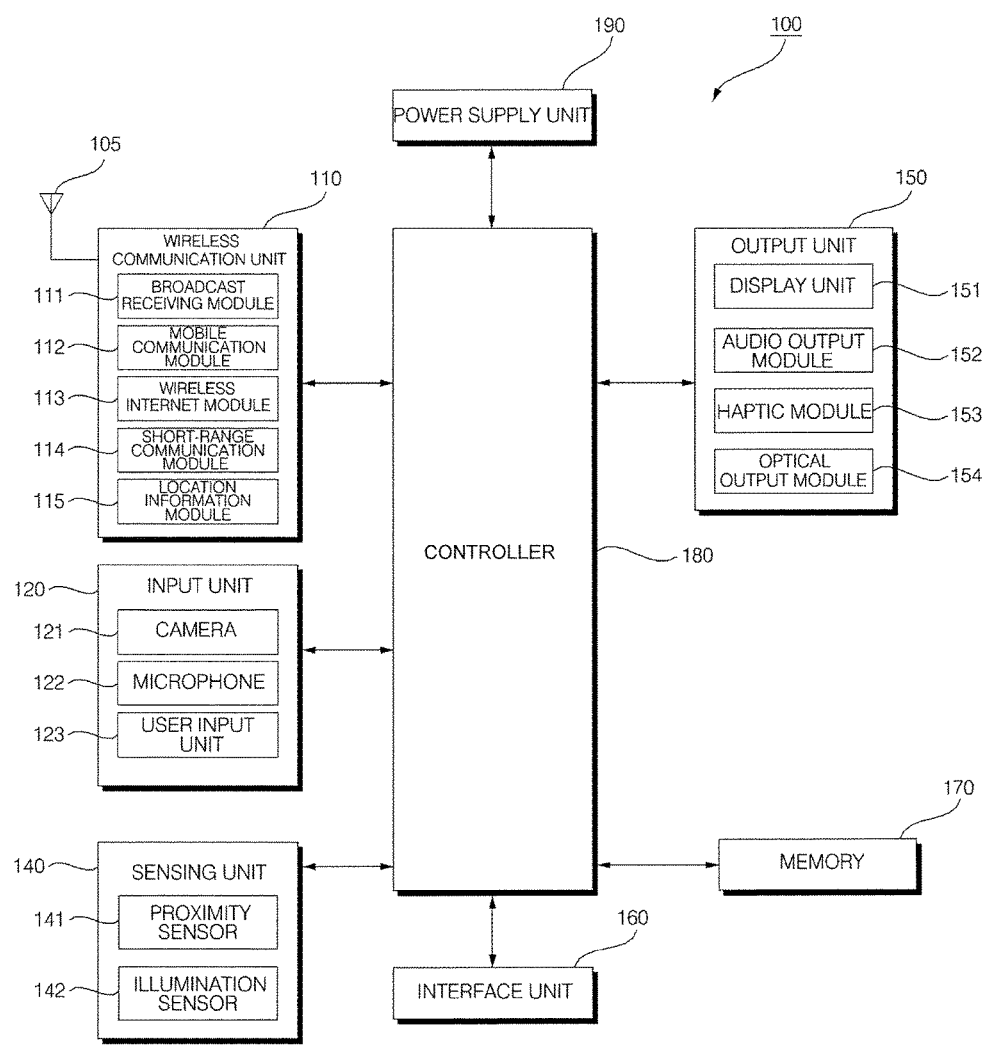
FIG. 1a is a block diagram of a mobile terminal in accordance with the present disclosure.
Figure 1B:
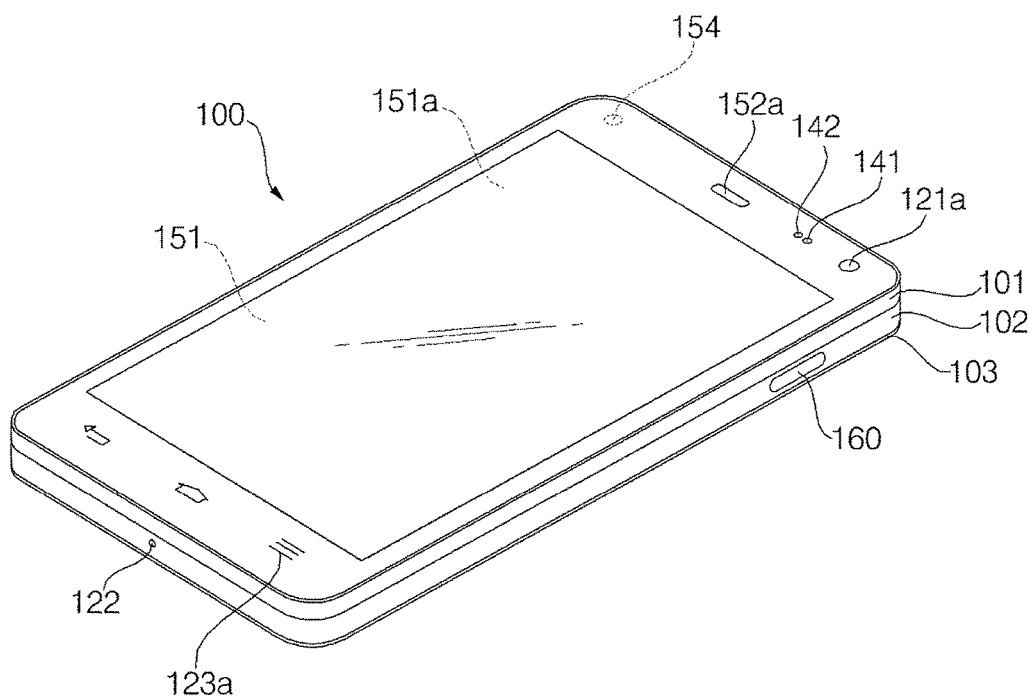
FIGS. 1b and 1c are conceptual views of one example of the mobile terminal, viewed from different directions.
Figure 1C:
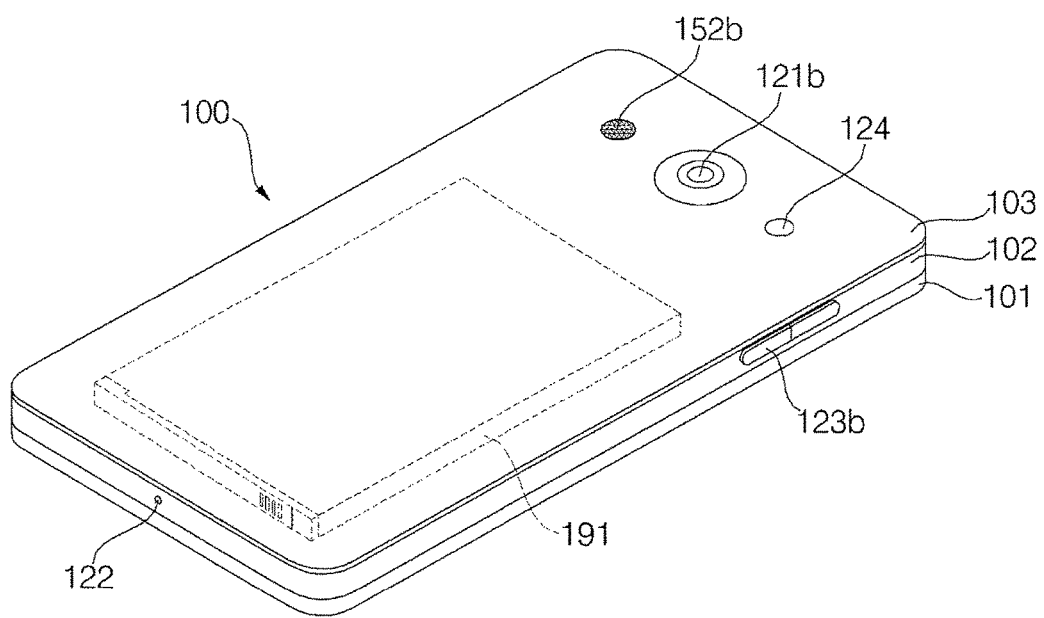

Reference is now made to FIGS. 1a-1c, where FIG. 1a is a block diagram of a mobile terminal in accordance with the present disclosure, and FIGS. 1b and 1c are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. Implementing all of the illustrated components is not a requirement, and that greater or fewer components may alternatively be implemented.

Referring now to FIG. 1a, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1a, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 can be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 can perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 can provide or process information or functions appropriate for a user by processing signals, data, information and the like, which are input or output by the various components depicted in FIG. 1a, or activating application programs stored in the memory 170. As one example, the controller 180 controls some or all of the components illustrated in FIGS. 1a-1c according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1a, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communication between a mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which can exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. Further, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 can sense which region of the display unit 151 has been touched. Here, the touch controller may be a component separate from the controller 180, the controller 180, and combinations thereof.

In some embodiments, the controller 180 can execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches include a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor. Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 can include message reception, call signal reception, a missed call, an alarm, a schedule notice, an email reception, information reception through an application, and the like.

A signal output by the optical output module 154 may be implemented so the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating a use authority of the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 can also be operated in relation to a network storage device that performs the storage function of the memory 170 over a network, such as the Internet.

The controller 180 can typically control the general operations of the mobile terminal 100. For example, the controller 180 can set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provides internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected. As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1b and 1c, the mobile terminal 100 is described with reference to a bar-type terminal body. However, the mobile terminal 100 can alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like. As an alternative to the example in which the plurality of cases form an inner space for accommodating components, the mobile terminal 100 can be configured such that one case foims the inner space. In this example, a mobile terminal 100 having a uni-body is formed so synthetic resin or metal extends from a side surface to a rear surface.

If desired, the mobile terminal 100 can include a waterproofing unit for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1b and 1c depict certain components as arranged on the mobile terminal. However, alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1a). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this instance, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1b illustrates the first manipulation unit 123a as a touch key, but possible alternatives include a mechanical key, a push key, a touch key, and combinations thereof. Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 can include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1c, a flash 124 is shown adjacent to the second camera 121b. When an image of a subject is captured with the camera 121b, the flash 124 may illuminate the subject. As shown in FIG. 1c, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 can include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 can be provided. The cover or pouch may cooperate with the display unit 151 to extend the function of the mobile terminal 100. Another example of the accessory is a touch pen for assisting or extending a touch input to a touch screen.

Further preferred embodiments will be described in more detail with reference to additional drawing figures. It is understood by those skilled in the art that the present features can be embodied in several forms without departing from the characteristics thereof.

Figure 2:
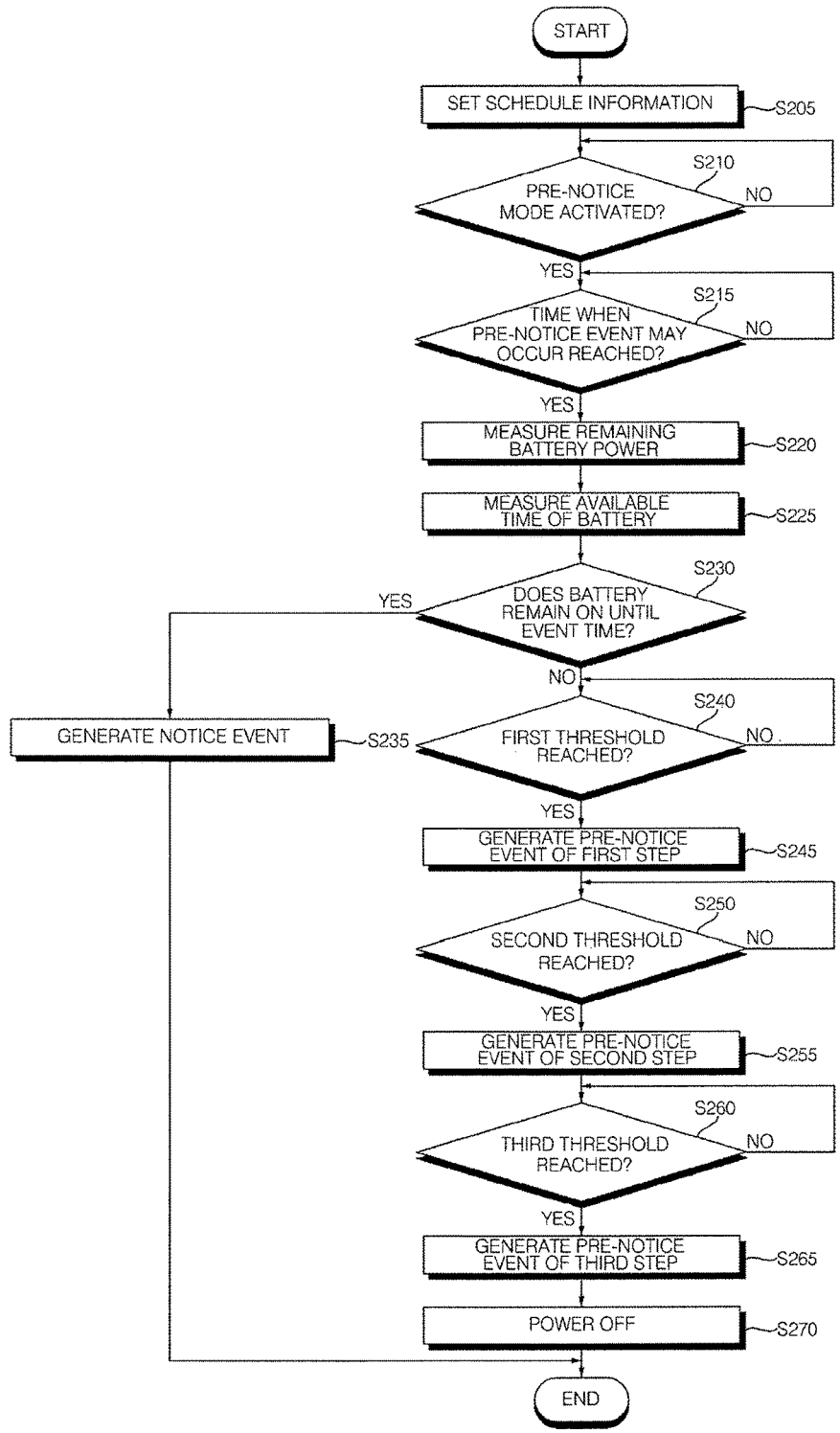
FIG. 2 is a flowchart illustrating operation of a mobile terminal according to one embodiment of the present invention.

In particular, FIG. 2 is a flowchart illustrating operation of a mobile terminal 100 according to one embodiment of the present invention. Referring to FIG. 2, the controller 180 executes a schedule application according to a user command and sets schedule information of a user (S205). At this time, the schedule information may include an event title, an event place, an event time (event start and end times), a notice time, a participant, other detailed information, etc.

The controller 180 can check whether a pre-notice mode (or a preliminary alarm mode) of the schedule information is activated, upon setting the schedule information (S210). The pre-notice mode refers to an operation mode for pre-notifying a user of information on a major event when a remaining battery power is insufficient.

In addition, the controller 180 can check whether the pre-notice mode is collectively activated with respect to all scheduled events, based on user input for an entire settings menu or a schedule settings menu.

If it is checked that the pre-notice mode is activated with respect to an individual scheduled event or all scheduled events in step S210, the controller 180 checks whether a time when a pre-notice event may occur (that is, a pre-notice event occurrence time) is reached based on the preset schedule time and the predetermined pre-notice time (or the preliminary alarm time) (S215). Here, the pre-notice time indicates a time range in which the pre-notice event is determined to be occurred. The pre-notice time may be directly set by the user upon setting the schedule information or the pre-notice mode or may be set by default by a terminal manufacturer.

If a pre-notice time is set to 4 hours when an event time (or a notice time set with respect to a scheduled event) is 19:00, a time when the pre-notice event may occur is 15:00 to 19:00. Therefore, the controller 180 checks whether a first time (that is, 15:00) when a pre-notice event may occur is reached.

Upon checking that the time when the pre-notice event may occur is reached in step S215, the controller 180 measures a remaining battery power of the mobile terminal 100 (S220). As another embodiment, without setting the pre-notice time, when the pre-notice mode is activated, operation for immediately measuring the remaining battery power may be performed.

The controller 180 measures a remaining time (i.e. an available time) of the battery based on the measured remaining battery power and the overall load of the terminal system (S225). Upon checking that the battery remains on until the event time or the notice time (S230), the controller 180 generates a normal notice event when the event time or the notice time is reached (S235). That is, the controller 180 does not provide the pre-notice service according to an embodiment of the present invention.

When the battery cannot remain on until the event time or the notice time (S230), the controller 180 periodically measures the remaining battery power and checks whether the remaining battery power reaches a predetermined threshold. Upon checking that the remaining battery power reaches a first threshold (S240), the controller 180 generates a pre-notice event corresponding to a first step (S245). At this time, the controller 180 can output a predetermined audio signal or haptic signal in correspondence with the first step.

More specifically, the controller 180 can display a pre-notice icon on a region (e.g. a status bar) of the display unit 151. When pre-notice information corresponding to the pre-notice icon is selected, the controller 180 can display a pre-notice screen including information on a scheduled event to be pre-notified and operation options related to pre-notice on the display unit 151. At this time, the operation options displayed on the pre-notice screen may be configured to be changed according to the preset schedule information.

Upon checking that the remaining battery power reaches a second threshold less than the first threshold (S250), the controller 180 generates a pre-notice event corresponding to a second step having discrimination higher than that of the first step (S255). At this time, the controller 180 can output a predetermined audio signal or haptic signal in correspondence with the second step.

More specifically, the controller 180 can provide the pre-notice event corresponding to the first step and, additionally, display pre-notice information corresponding to the pre-notice icon on a lock screen. In addition, the controller 180 can display a virtual icon related to the scheduled event on the display unit 151 in a floating state.

Upon checking that the remaining battery power reaches a third threshold less than the second threshold (S260), the controller 180 generates a pre-notice event corresponding to a third step having discrimination power higher than that of the second step (S265). At this time, the controller 180 can output a predetermined audio signal or haptic signal in correspondence with the third step.

More specifically, the controller 180 can provide the pre-notice events corresponding to the first and second steps and, additionally, provide an alarm power on mode. The alarm power on mode refers to an operation mode for manually or automatically powering the mobile terminal 100 off and automatically booting the terminal system upon reaching the event time to provide alarm information.

In addition, the controller 180 can generate the same notice event as a real (or normal) notice event to be generated upon reaching the event time, when the remaining battery power reaches the third threshold. As another embodiment, when the remaining battery power reaches a fourth threshold less than the third threshold, the same notice event as a real notice event may be configured to be generated.

The controller 180 powers the mobile terminal 100 off when the battery is discharged (S270). Thereafter, when the battery is charged and the mobile terminal 100 is powered on again, the controller 180 can display information on a scheduled event set during the power off period on the display unit 151.

Although the state of the battery is divided into three steps and different pre-notice services are provided according to step in the present embodiment, the present invention is not limited thereto. Accordingly, it will be apparent to those skilled in the art that the state of the battery may be divided into more or less than three steps and pre-notice services corresponding to the steps may be provided.

In addition, although operation for pre-notifying the user of the information on the preset scheduled event when the remaining battery power is insufficient is described in the present embodiment, the present invention is not limited thereto. It will be apparent to those skilled in the art that the technical ideas of the present invention are equally applicable to information on an alarm in addition to the scheduled event.

As described above, the mobile terminal according to one embodiment of the present invention provides the pre-notice event for the preset scheduled event or alarm using various methods according to a state of the battery when the remaining battery power is insufficient, thereby preventing the user from missing the major event or alarm when the mobile terminal is powered off due to battery discharge.

Figure 3:
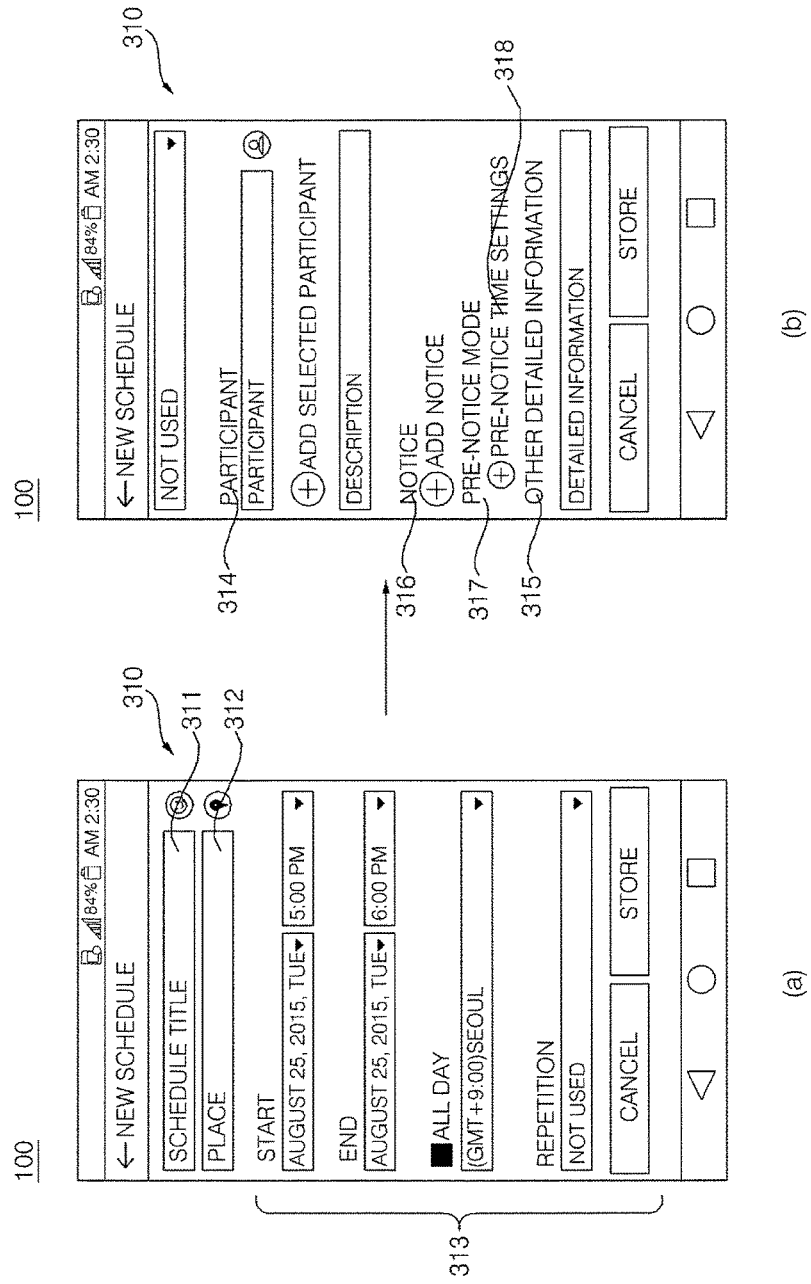
FIGS. 3 and 4 are views illustrating operation of a mobile terminal for setting a pre-notice mode and a pre-notice time.
Figure 4:
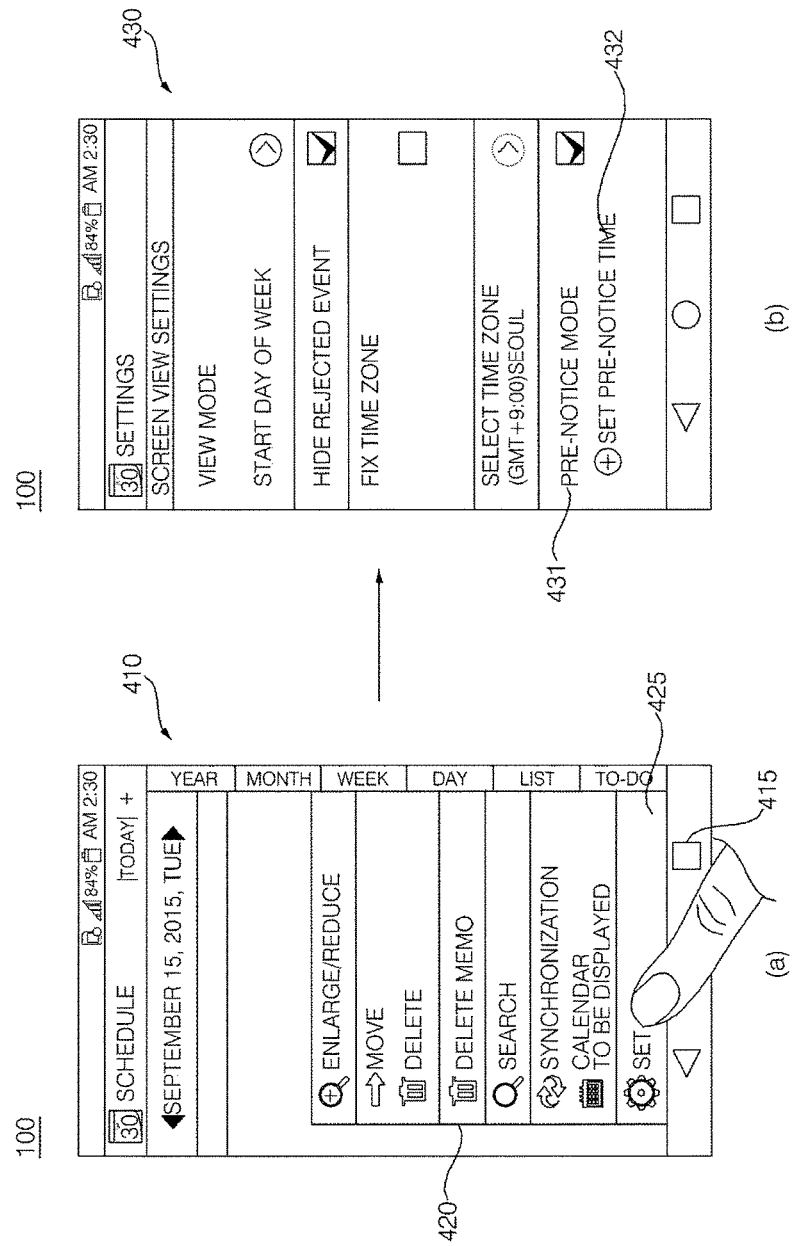

FIGS. 3 and 4 are views illustrating operation of a mobile terminal for setting a pre-notice mode and a pre-notice time. Referring to FIG. 3, the mobile terminal 100 can execute the schedule application according to a user command and display an operation screen corresponding to the application on the display unit 151.

When a new schedule menu is selected on the operation screen, the mobile terminal 100 can display a schedule setting screen 310 for inputting a new event on the display unit 151. The schedule setting screen 310 may include a first item 311 for inputting an event title, a second item 312 for inputting an event place, a third item 313 for inputting an event time, a fourth item 314 for inputting a participant, a fifth item 315 for inputting other detailed information (e.g., a website address), a sixth item 316 for adding a notice time, a seventh item 317 for setting a pre-notice mode and an eighth item 318 for setting a pre-notice time.

The mobile terminal 100 can activate or deactivate the pre-notice mode for the schedule information via user input for the seventh item 317. In addition, the mobile terminal 100 can set the pre-notice time of the schedule information via user input for the eighth item 318.

When the pre-notice time is not set, the mobile terminal 100 can automatically set the pre-notice time to a predetermined default time (e.g., 6 hours). In this instance, the mobile terminal 100 can detect current position information and calculate a distance between the user and the event place upon reaching the time when the pre-notice event may occur. When the distance between the user and the event place is small, the mobile terminal 100 can change the pre-notice time to a time less than the default time.

The schedule information input to the schedule setting screen 310 may be used to determine the priority of the scheduled event. As the priority of the scheduled event increases, the threshold of the remaining battery power corresponding to a pre-notice event occurrence condition may increase or the state of the battery may be divided into more steps to provide more pre-notice events.

In addition, the schedule information input to the schedule setting screen 310 may be used to determine the contents of the pre-notice event (that is, the operation options of the user for pre-notice) to be generated when the remaining battery power is insufficient.

Referring to FIG. 4, the mobile terminal 100 can display an operation screen 410 corresponding to the schedule application on the display unit 151 according to a user command. When a menu button 415 is selected while the operation screen 410 is displayed, the mobile terminal 100 can display a popup window 420 including menus related to the scheduled event on the display unit 151. At this time, the popup window 420 may include a search menu, a synchronization menu, a delete menu, a move menu, a settings menu, etc.

When the settings menu 425 is selected in the popup window 420, the mobile terminal 100 can display a schedule setting screen 420 shown in FIG. 4(*b*) on the display unit 151. At this time, the schedule setting screen 420 may include a first item 431 for setting a pre-notice mode and a second item 432 for setting a pre-notice time.

The mobile terminal 100 can collectively activate or deactivate the pre-notice modes of all scheduled events via user input for the first item 431. In addition, the mobile terminal 100 can collectively set the pre-notice times of all scheduled events via user input for the second item 432. Similarly, when the pre-notice time is not set, the mobile terminal 100 can automatically set the pre-notice times of all scheduled events to a predetermined default time.

Figure 5:
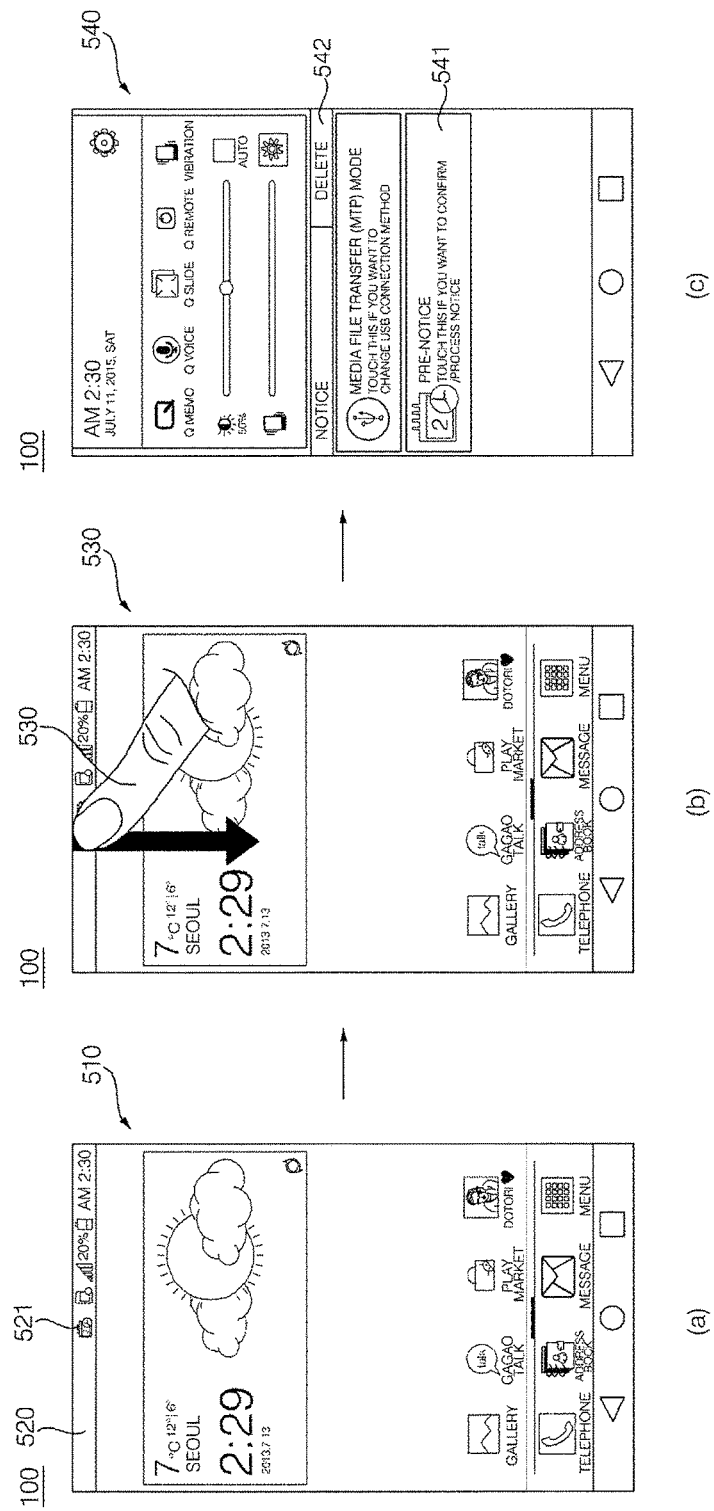
FIGS. 5 to 7 are views illustrating operation of a mobile terminal for generating a pre-notice event corresponding to a first step when a remaining battery power reaches a first threshold.
Figure 6:
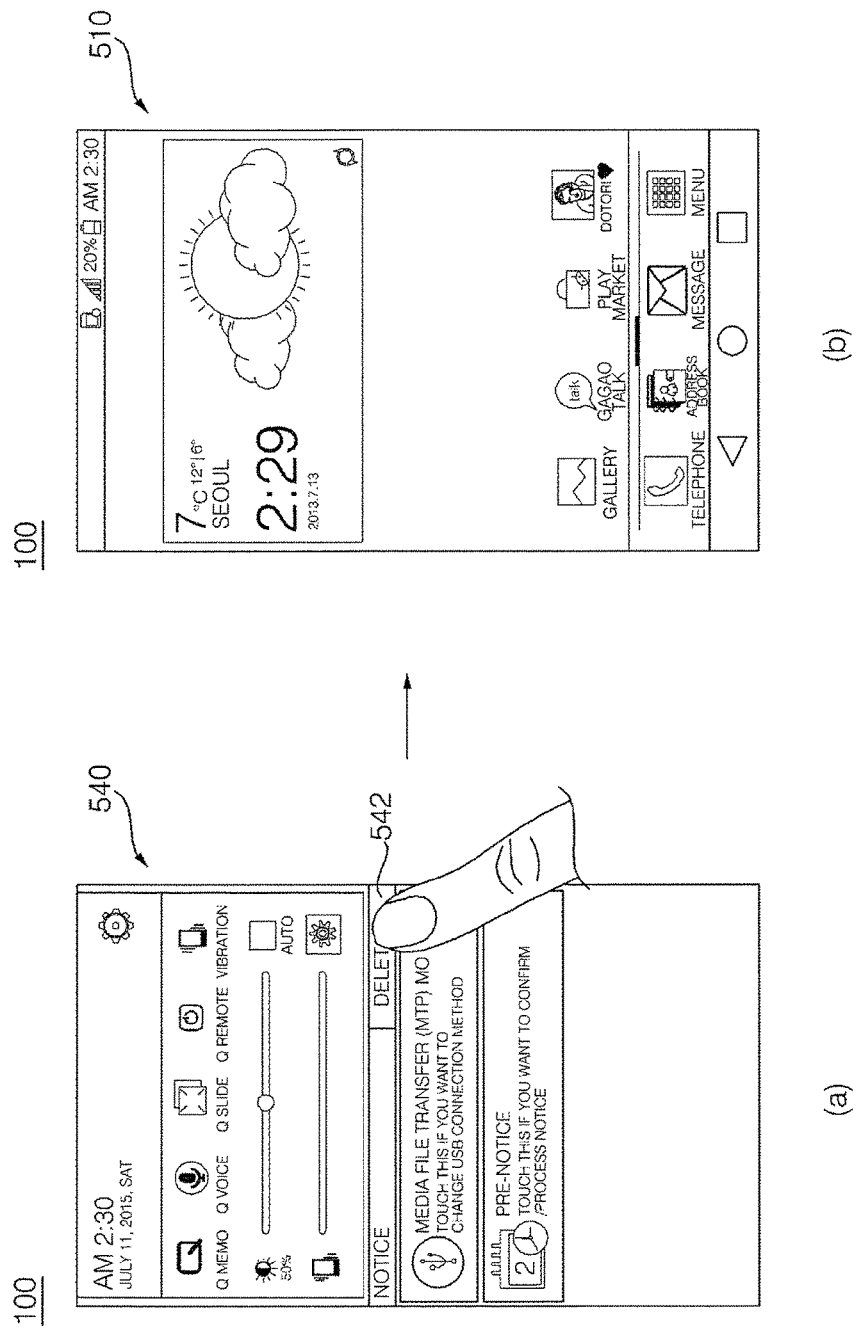
Figure 7:
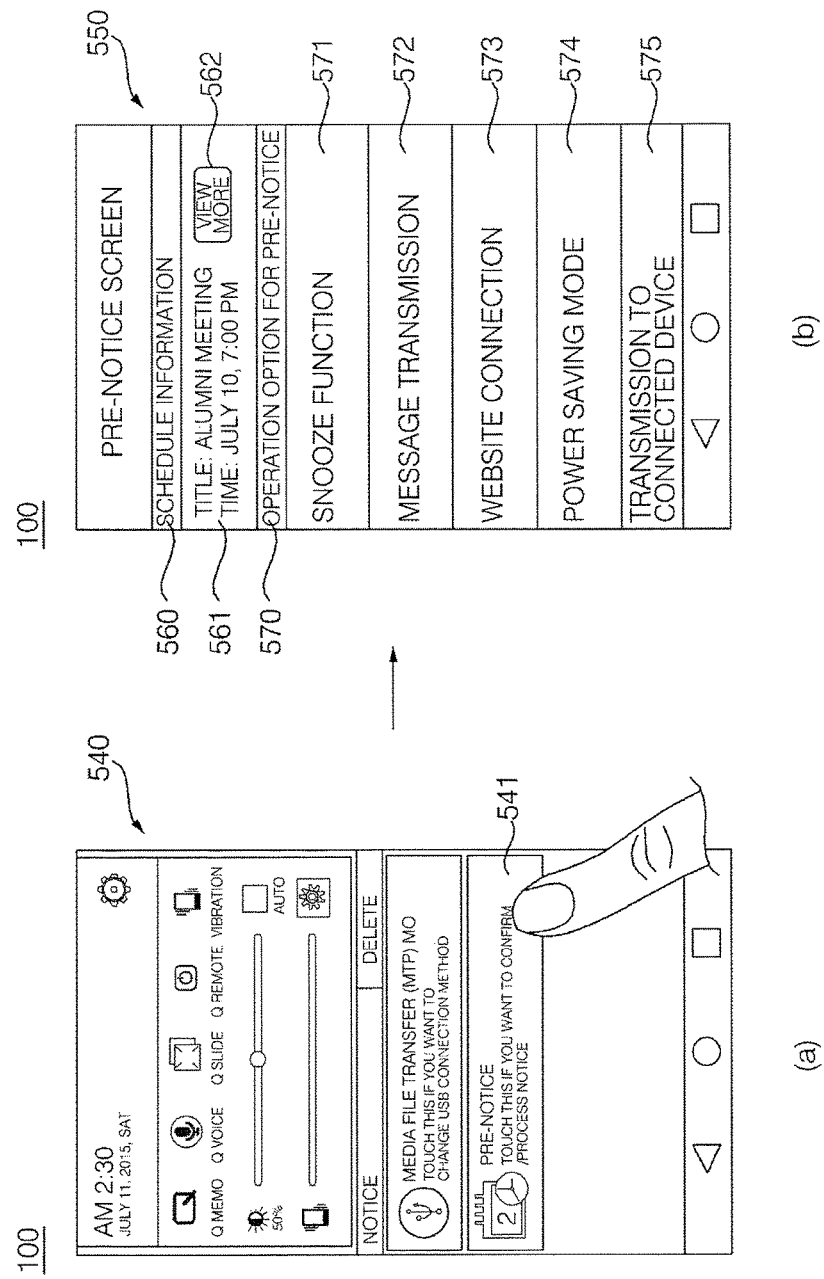

FIGS. 5 to 7 are views illustrating operation of a mobile terminal for generating a pre-notice event corresponding to a first step when a remaining battery power reaches a first threshold. Referring to FIGS. 5 to 7, the mobile terminal 100 can display a home screen 510 on the display unit 151 according to a user command. Hereinafter, in the present embodiment, assume that at least one scheduled event set and a pre-notice mode is activated in the mobile terminal 100.

The mobile terminal 100 can determined whether a time when a pre-notice event may occur is reached based on the preset event time and pre-notice time, upon activating the pre-notice mode. Upon determining that the time when the pre-notice event may occur is reached, the mobile terminal 100 can measure the remaining battery power. The mobile terminal 100 can measure the remaining time of the battery based on the measured remaining battery power and the load of the terminal system.

When it is determined that the battery cannot remain on until the event time or the notice time according to the measured result, the mobile terminal 100 can periodically measure the remaining battery power and check whether the remaining battery power reaches the predetermined first threshold. Hereinafter, in the present embodiment, the first threshold may be set to 20% without being limited thereto.

Upon determining that the remaining battery power reaches the first threshold, the mobile terminal 100 can generate the pre-notice event corresponding to the first step. The mobile terminal 100 can display the pre-notice icon 521 indicating that there is a scheduled event upcoming after the battery is discharged on the status bar 520 of the display unit 151. When there is a plurality of scheduled events upcoming after the battery is discharged, the mobile terminal 100 can display an indicator indicating the number of scheduled events on or near the pre-notice icon 521.

In addition, the mobile terminal 100 can output a predetermined sound or haptic signal to alert the user upon reaching the first threshold. When user input 530 for touching the upper end of the display unit 151 and dragging downward is received in a state of displaying the home screen 510, the mobile terminal 100 can display a notice screen 540 shown in FIG. 5(c) on the display unit 151. At this time, the notice screen 540 may include pre-notice information 541 corresponding to the pre-notice icon 521 and a delete menu 542. When there is a plurality of scheduled events upcoming after the battery is discharged, the mobile terminal 100 can display pre-notice information corresponding to the plurality of scheduled events on the notice screen 540.

When the delete menu 542 displayed on the notice screen 540 is selected or an input for dragging the pre-notice information 541 in the left or right direction is received, the mobile terminal 100 can delete the pre-notice information 541. Thereafter, when upward touch and drag input is received, the mobile terminal 100 can display the home screen 510 on the display unit 151 again. At this time, the mobile terminal 100 can display the status bar without the pre-notice icon 521 on the display unit 151.

When the pre-notice information 541 displayed on the notice screen 540 is selected, the mobile terminal 100 can display a pre-notice screen 550 shown in FIG. 7(b) on the display unit 151. When the pre-notice information 541 is selected, the mobile terminal 100 can display the status bar without the pre-notice icon 521 on the display unit 151.

The pre-notice screen 550 may include a schedule information item 560 and an operation option item for pre-notice 570. The schedule information item 560 may include information 561 on a scheduled event to be pre-notified and a more view menu 562. When the more view menu 562 is selected, detailed information on the scheduled event may be provided.

The operation option item 570 for pre-notice 570 may include a snooze setting menu 571, a message transmission menu 572, a website connection menu 573, a power-saving mode menu 574 and a transmission-to-connected device menu 575. The menus 571 to 575 included in the operation option item 570 may be changed according to schedule information input to the schedule setting screen 310.

If website information is included in the schedule information, the website connection menu 573 may be activated on the pre-notice screen. If participant information is included in the schedule information, the message transmission menu 572 may be activated on the pre-notice screen. Hereinafter, the functions of the operation options 571 to 575 will be described in detail with reference to FIGS. 8 to 12.

Figure 8:
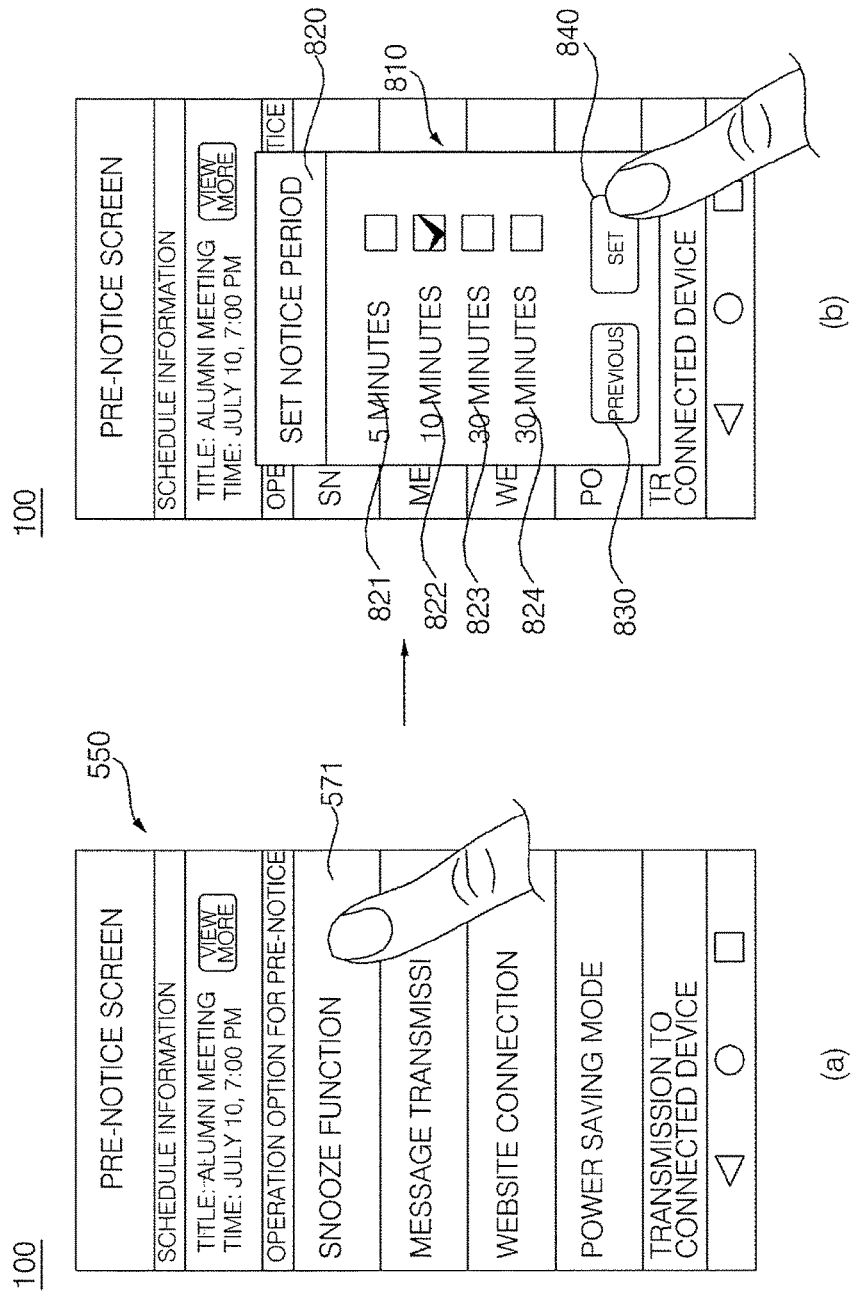
FIGS. 8 to 12 are views illustrating operation options of a user for pre-notice.

FIGS. 8 to 12 are views illustrating operation options of a user for pre-notice. As shown in FIG. 8, when the snooze setting menu 571 of the pre-notice screen 550 is selected, the mobile terminal 100 can display a popup window 810 for setting a snooze function on the display unit 151. At this time, the popup window 810 may include a menu 820 for setting a notice period of the snooze function, a previous icon 830, a set icon 840, etc. The notice period setting menu 820 may include a 5-minute period item 821, a 10-minute period item 822, a 30-minute period item 823 and a 60-minute period item 824, without being limited thereto.

When the notice period of the snooze function is set to 10 minutes via the popup window 810, the mobile terminal 100 can output an audio signal or a vibration signal every 10 minutes. Therefore, the user of the mobile terminal 100 can easily recognize occurrence of the pre-notice event via the periodically output sound or vibration signal.

Figure 9:
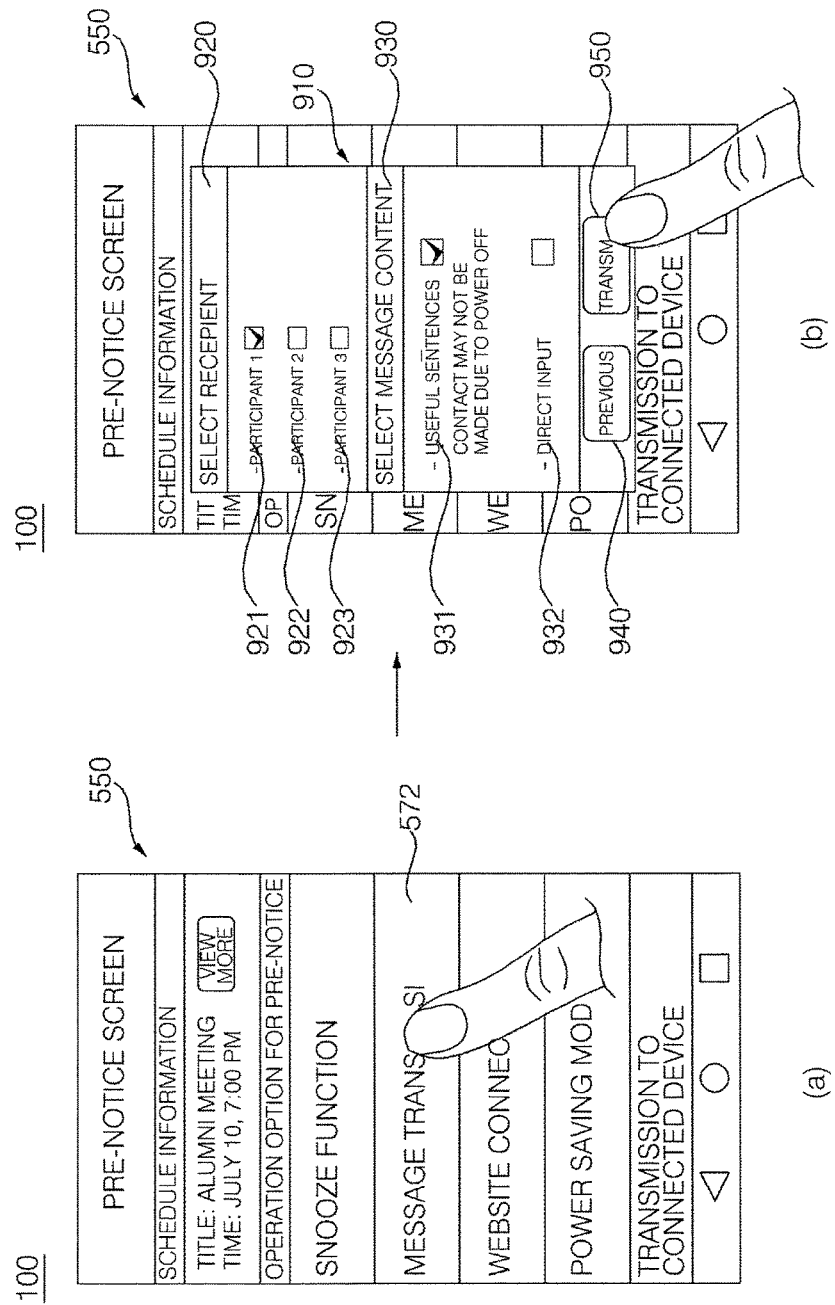

As shown in FIG. 9, when the message transmission menu 572 of the pre-notice screen 550 is selected, the mobile terminal 100 can display a popup window 910 for inputting a message recipient and message contents on the display unit 151. The popup window 910 may include a message recipient selection menu 920, a message contents selection menu 930, a previous icon 940 and a transmit icon 950.

The message recipient selection menu 920 may include participant items 921 to 923 input to the scheduled event. The message contents selection menu 930 may include a predetermined useful sentences item 931 and a direct input item 932.

When the message recipient and the message contents are selected via the popup window 910, the mobile terminal 100 can transmit a message including the selected contents to the mobile terminal of the selected participant. The participant who has received the message may recognize that the mobile terminal 100 of the user may be powered off due to battery discharge.

Figure 10:
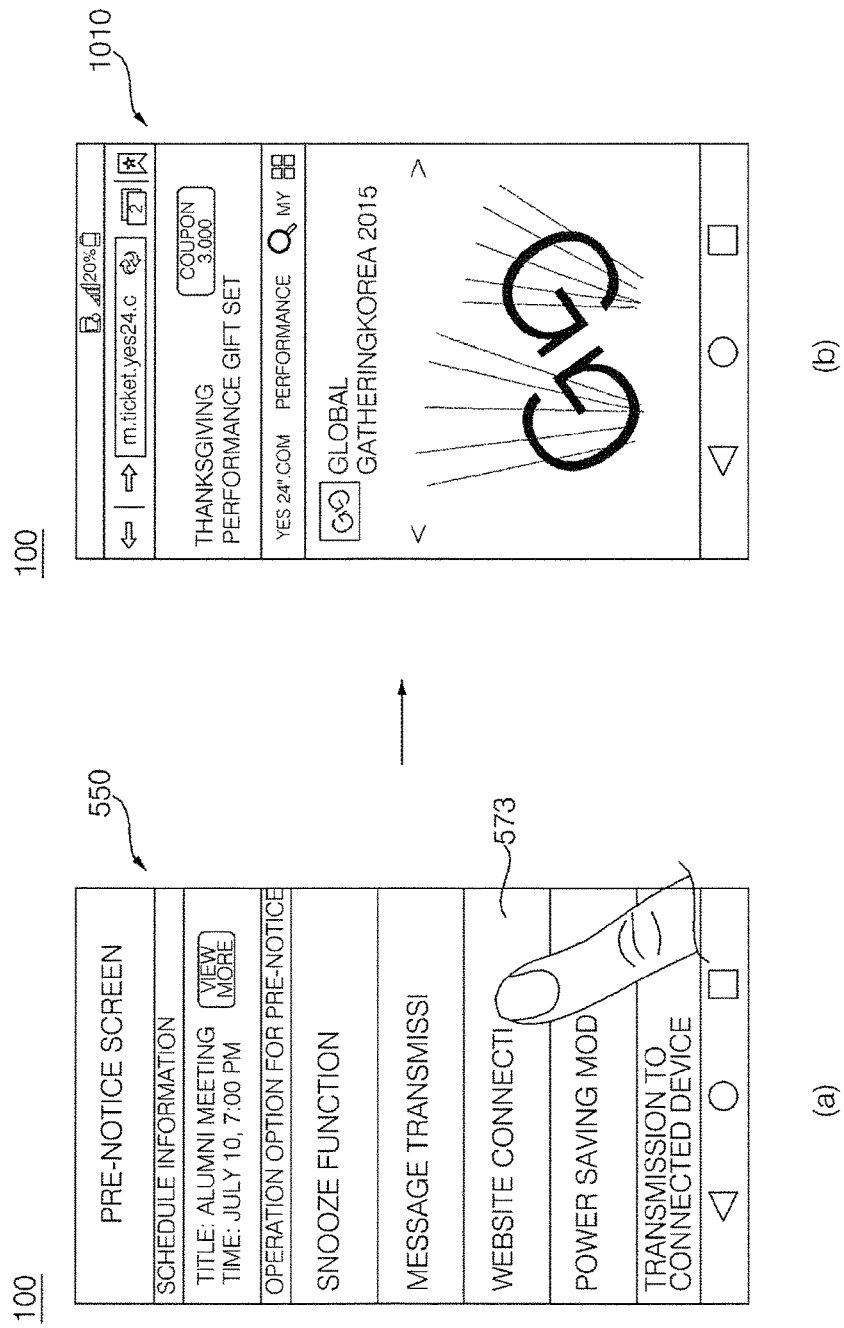

As shown in FIG. 10, when the website connection menu 573 of the pre-notice screen 550 is selected, the mobile terminal 100 can access a website address input to the scheduled event. The mobile terminal 100 can display a webpage screen provided by the accessed website on the display unit 151.

Figure 11:
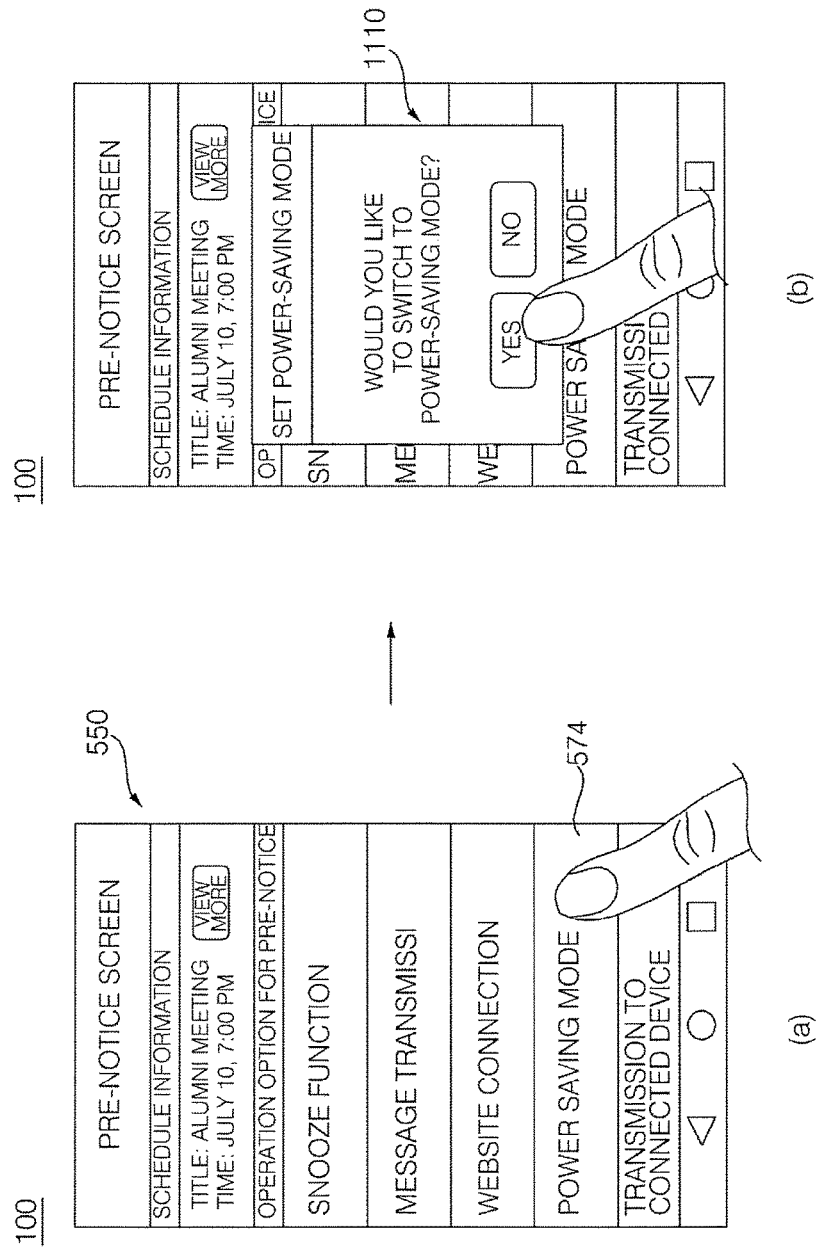

As shown in FIG. 11, when the power-saving menu 574 of the pre-notice screen 550 is selected, the mobile terminal 100 can display a popup window 1110 for inquiring about switching to a power-saving mode on the display unit 151. When the power-saving mode is selected via the popup window 1110, the mobile terminal 100 can switch the operation mode from a normal mode to a power-saving mode.

Figure 12:
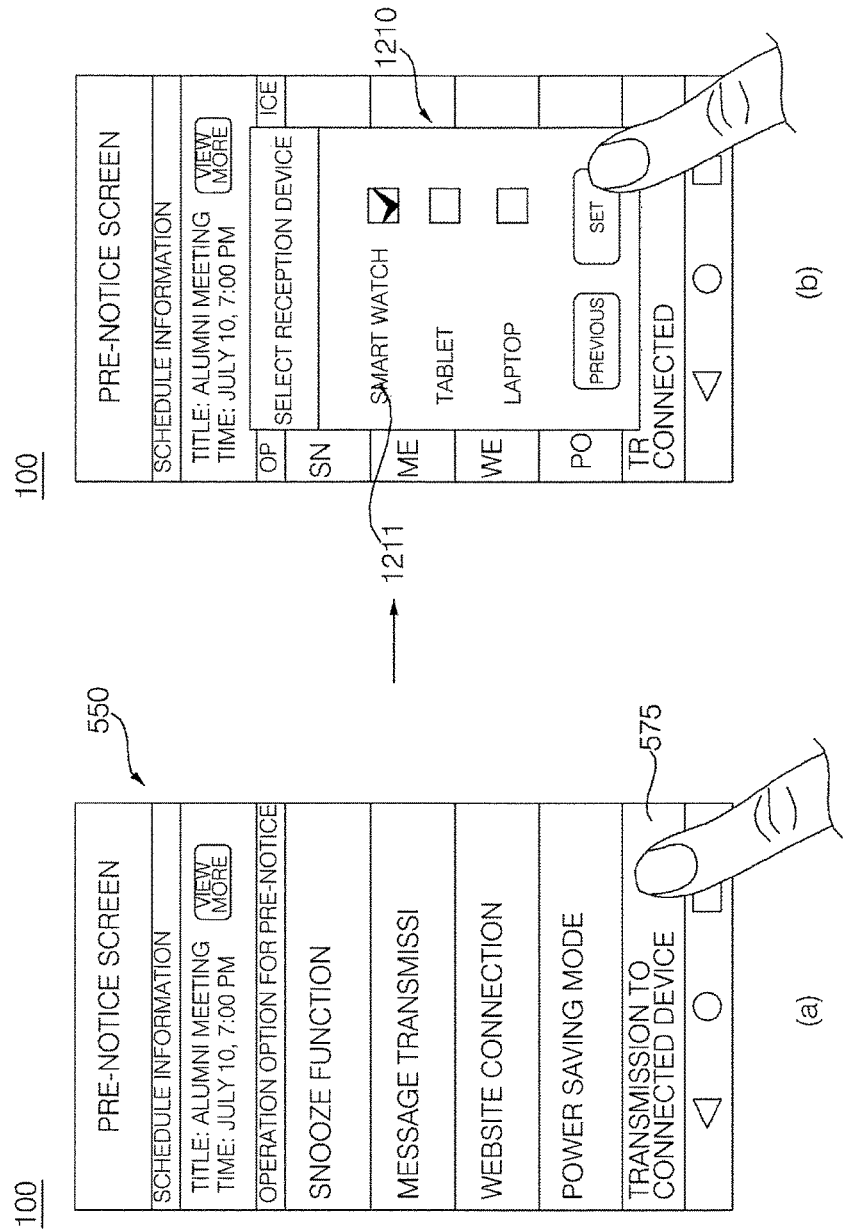

As shown in FIG. 12, when the transmission-to-connected device menu 575 of the pre-notice screen 550 is selected, the mobile terminal 100 can display a popup window 1210 including a list of devices currently connected thereto on the display unit 151. When at least one connected device 1211 is selected via the popup window 1210, the mobile terminal 100 can transmit information on the scheduled event to the selected device 1211. Therefore, the user can conveniently check the scheduled event via the selected device 1211 even when the mobile terminal 100 is powered off.

Figure 13:
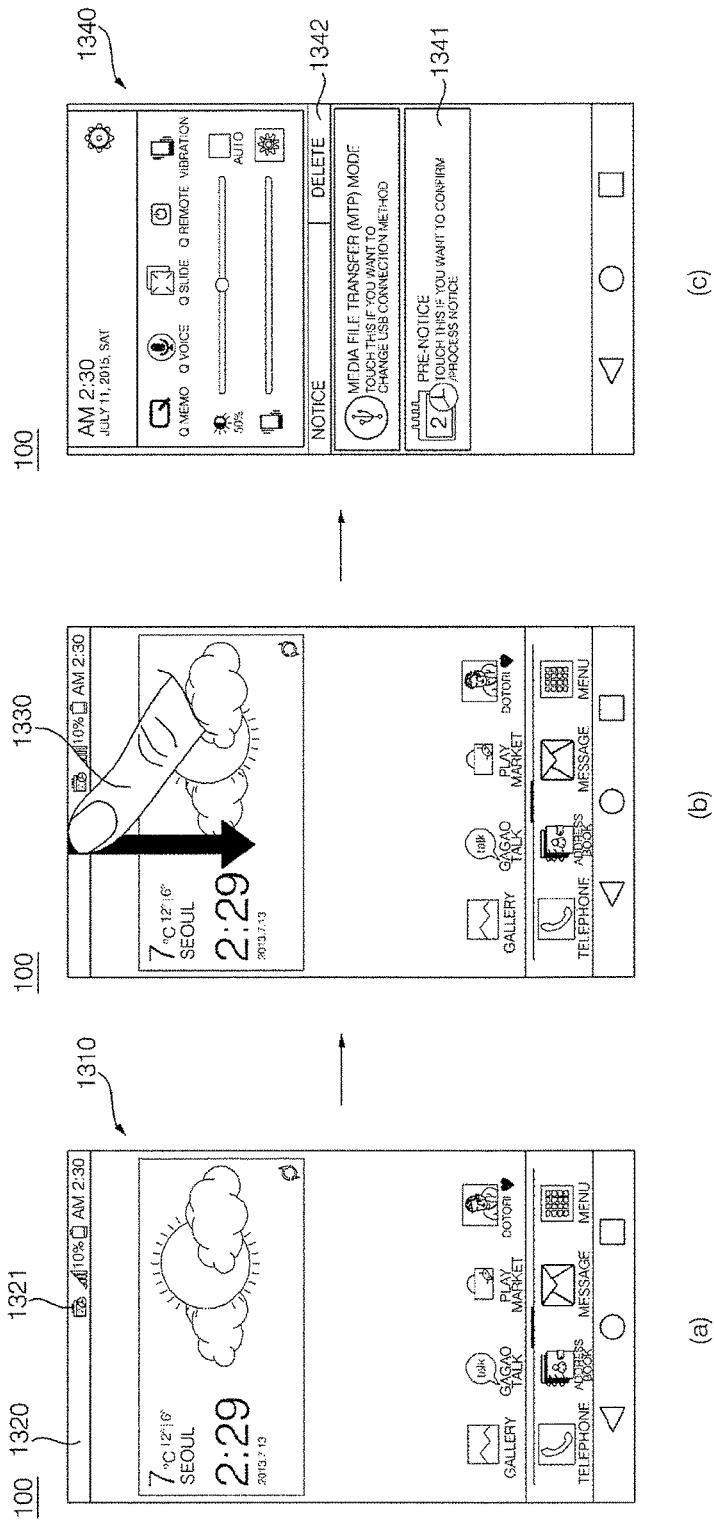
FIGS. 13 to 15 are views illustrating operation of a mobile terminal for generating a pre-notice event corresponding to a second step when a remaining battery power reaches a second threshold.
Figure 14:
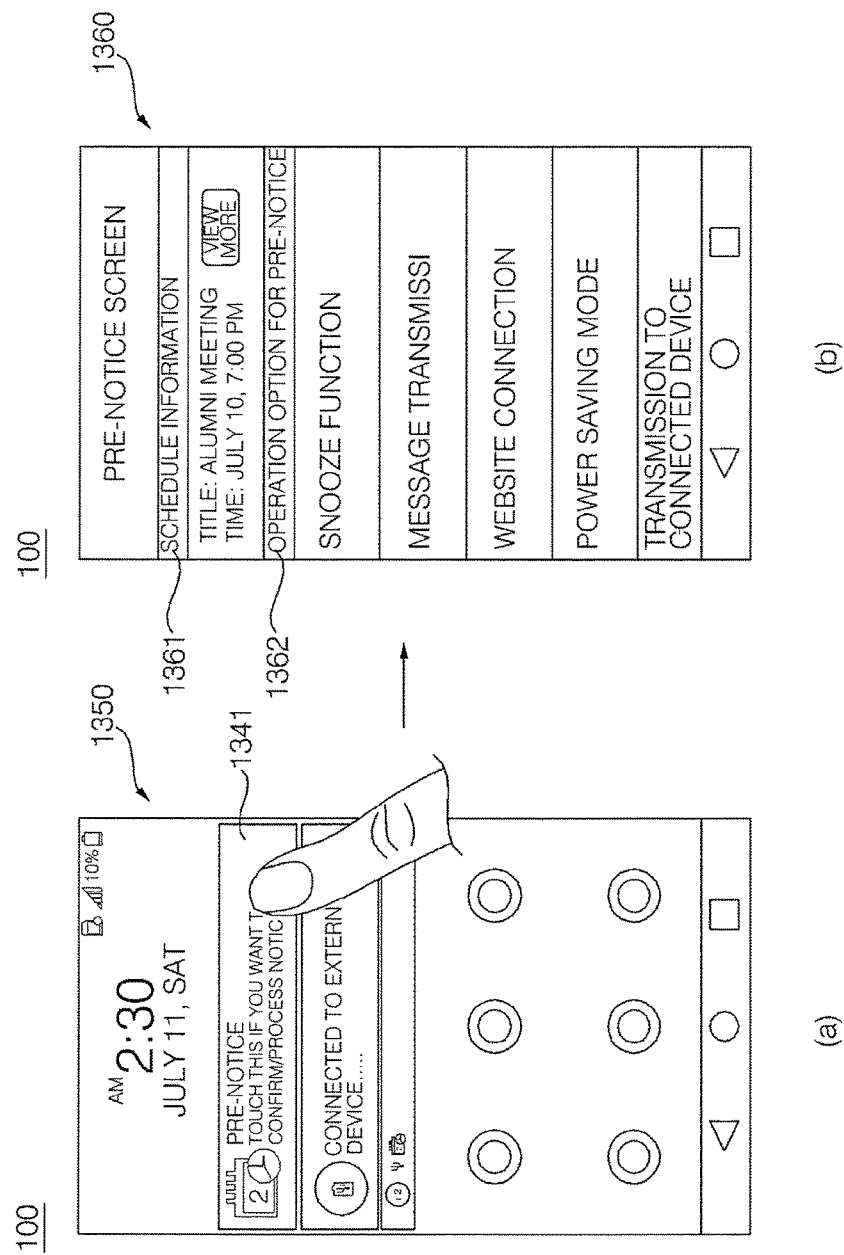
Figure 15:
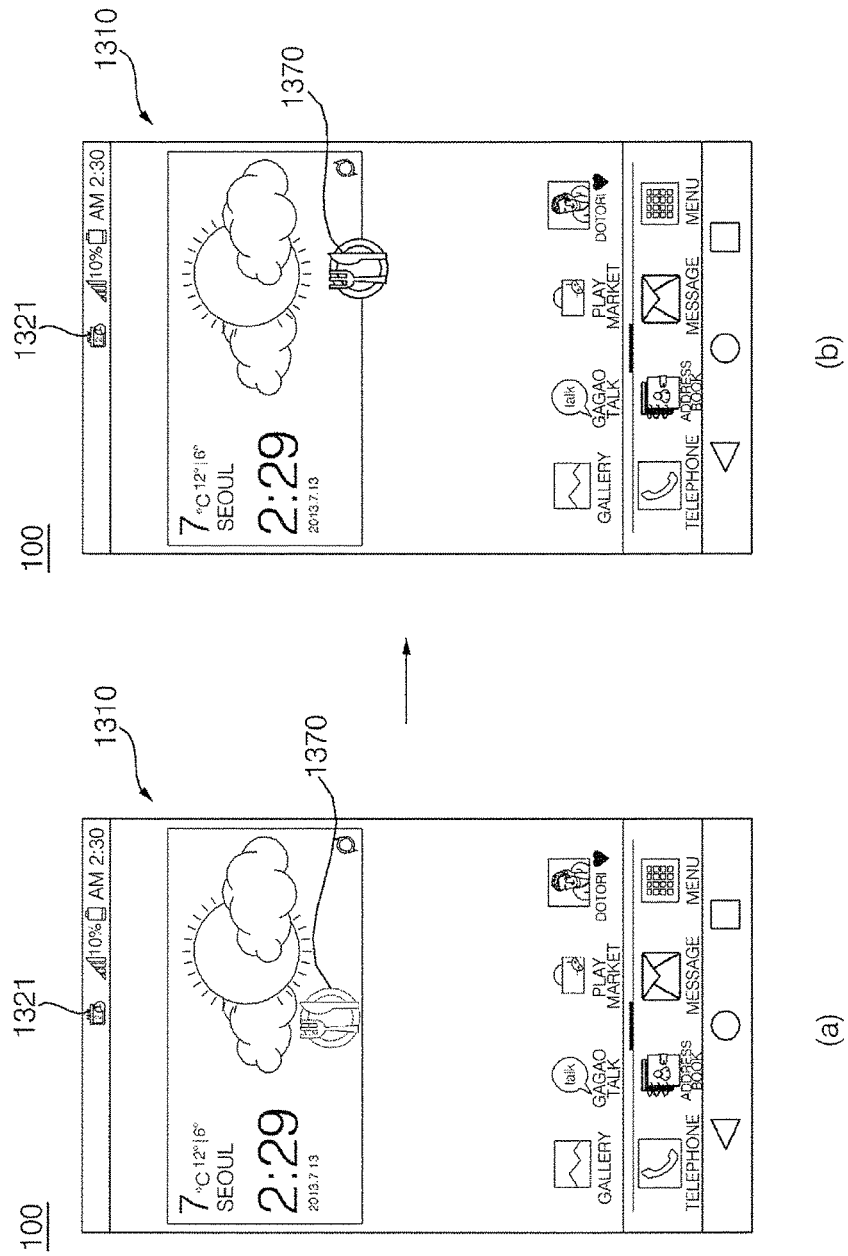

FIGS. 13 to 15 are views illustrating operation of a mobile terminal for generating a pre-notice event corresponding to a second step when a remaining battery power reaches a second threshold. Referring to FIGS. 13 to 15, the mobile terminal 100 can periodically measure the remaining battery power and determine whether the remaining battery power reaches the predetermined second threshold. Hereinafter, in the present invention assume that the second threshold may be set to 10%, without being limited thereto.

Upon determining that the remaining battery power reaches the second threshold, the mobile terminal 100 can generate the pre-notice event corresponding to the second step. That is, the mobile terminal 100 can provide the pre-notice event corresponding to the first step and an additional notice event. The mobile terminal 100 can display the pre-notice icon 1321 indicating that there is a scheduled event upcoming after the battery is discharged on the status bar 1320 of the home screen 1310.

When the pre-notice icon displayed on the status bar does not disappear in the previous step, the mobile terminal 100 can maintain the display of the pre-notice icon and output only a predetermined sound or haptic signal. In addition, when user input 1330 of touching the upper end of the display unit 151 and dragging downward is received in a state of displaying the home screen 1310, the mobile terminal 100 can display a notice screen 1340 shown in FIG. 13(*c*) on the display unit 151. At this time, the notice screen 1340 may include pre-notice information 1341 corresponding to the pre-notice icon 1321 and a delete menu 1342.

When the pre-notice information 1341 displayed on the notice screen 1340 is selected, the mobile terminal 100 can display the pre-notice screen 1360 shown in FIG. 14(*b*) on the display unit 151. When the pre-notice information 541 is not selected in the previous step, even if the touch and drag input is received via the pre-notice information 1341 or the delete menu 1342 is selected, the pre-notice information 1341 may not be deleted.

In addition, when the remaining battery power reaches the second threshold, the mobile terminal 100 can display the pre-notice information 1341 corresponding to the pre-notice icon 1321 on a lock screen 1350. When the pre-notice information 1341 displayed on the lock screen 1350 is selected, the mobile terminal 100 can display the pre-notice screen 1360 shown in FIG. 14(*b*) on the display unit 151.

When the pre-notice information 1341 displayed on the notice screen 1340 or the lock screen 1350 is selected, the mobile terminal 100 can display the status bar without the pre-notice icon 1321 on the display unit 151. As shown in FIG. 15, when the pre-notice information 1341 is not selected, the mobile terminal 100 can display a virtual icon 1370 related to the scheduled event on the home screen 1310 in a floating state. At this time, the virtual icon 1370 may be gradually enlarged or may gradually become clear as time elapses.

The mobile terminal 100 can display the pre-notice screen 1360 shown in FIG. 14(*b*) on the display unit 151 upon selecting the virtual icon 1370. At this time, the pre-notice screen 1360 may include a schedule information item 1361 and an operation option item for pre-notice 1362.

Figure 16:
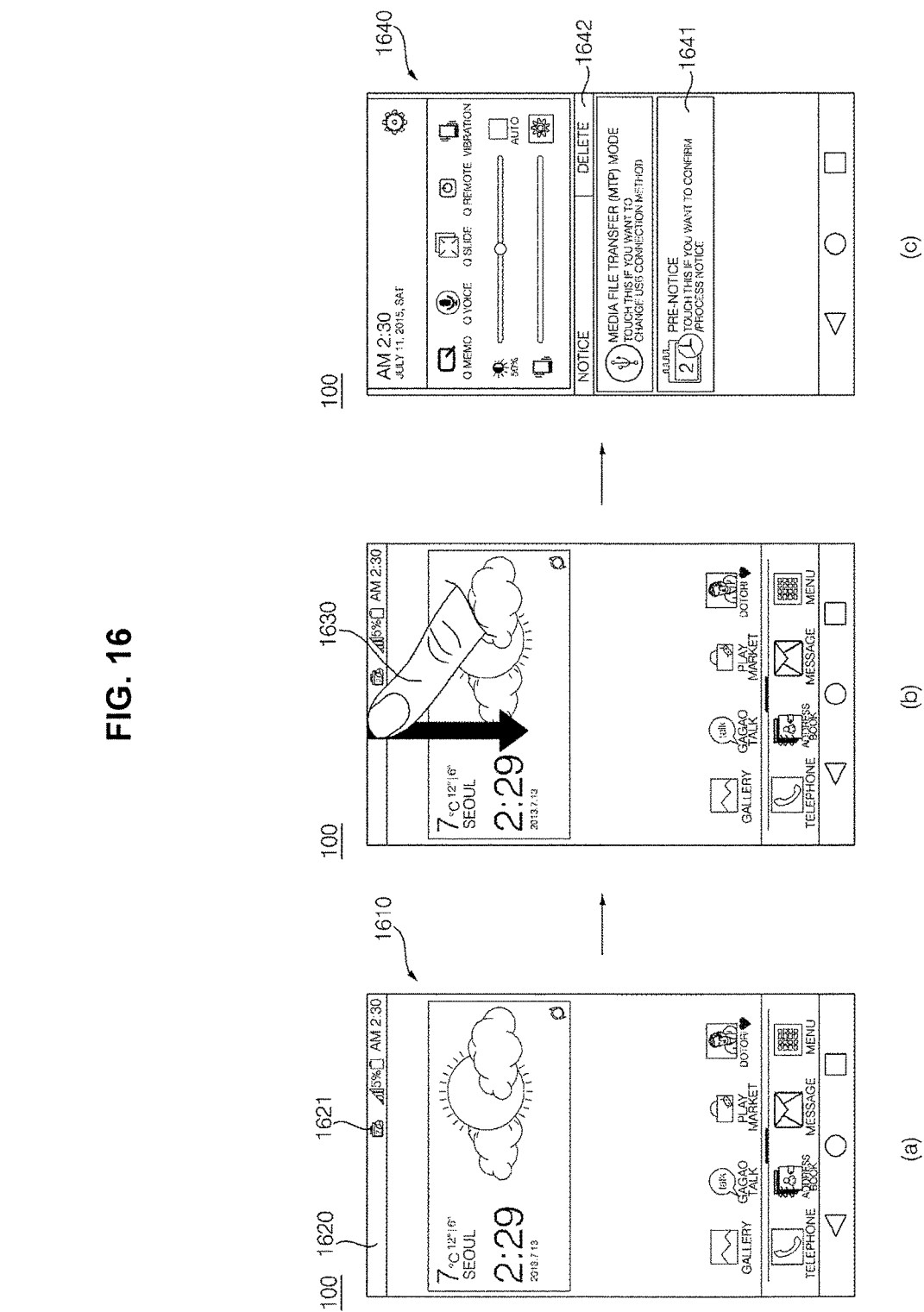
FIGS. 16 and 17 are views illustrating operation of a mobile terminal for generating a pre-notice event corresponding to a third step when a remaining battery power reaches a third threshold.
Figure 17:
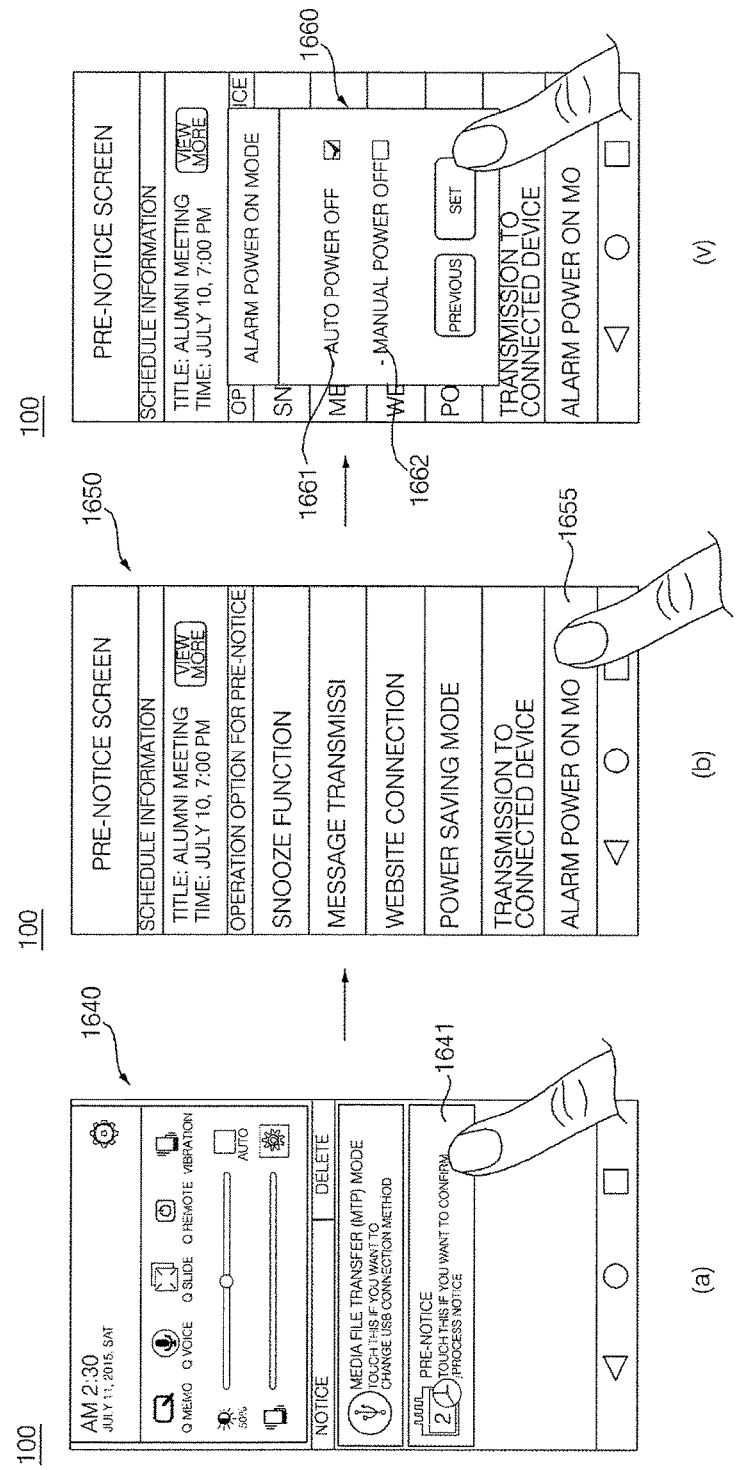

FIGS. 16 and 17 are views illustrating operation of a mobile terminal for generating a pre-notice event corresponding to a third step when a remaining battery power reaches a third threshold. Referring to FIGS. 16 and 17, the mobile terminal 100 can periodically measure the remaining battery power and determine whether the remaining battery power reaches the third threshold. Hereinafter, in the present embodiment, the third threshold may be set to 5%, without being limited thereto.

Upon determining that the remaining battery power reaches the third threshold, the mobile terminal 100 can generate the pre-notice event corresponding to the third step. That is, the mobile terminal 100 can provide the pre-notice events corresponding to the first and second steps and an additional notice event.

The mobile terminal 100 can display a pre-notice icon 1621 indicating that there is a scheduled event upcoming after the battery is discharged on the status bar 1620 of the home screen 1610. When the pre-notice icon displayed on the status bar does not disappear in the previous steps, the mobile terminal 100 can maintain display of the pre-notice icon and output only a predetermined sound or haptic signal.

In addition, when user input 1630 for touching the upper end of the display unit 151 and dragging downward is received in a state of displaying the home screen 1610, the mobile terminal 100 can display a notice screen 1640 shown in FIG. 16(*c*) on the display unit 151. At this time, the notice screen 1340 may include pre-notice information 1641 corresponding to the pre-notice icon 1621 and a delete menu 1642.

When the pre-notice information 1641 displayed on the notice screen 1640 is selected, the mobile terminal 100 can display a pre-notice screen 1650 shown in FIG. 17(*b*) on the display unit 151. When the pre-notice information 541 and 1341 is not selected in the previous steps, even if the touch and drag input is received via the pre-notice information 1641 or the delete menu 1642 is selected, the pre-notice information 1641 may not be deleted.

In addition, when the remaining battery power reaches the third threshold, the mobile terminal 100 can display the pre-notice information corresponding to the pre-notice icon on a lock screen. When the pre-notice information displayed on the lock screen is selected, the mobile terminal 100 can display the pre-notice screen 1650 shown in FIG. 17(*b*) on the display unit 151.

When the pre-notice information displayed on the notice screen or the lock screen is selected, the mobile terminal 100 can display the status bar without the pre-notice icon 1621 on the display unit 151. When the pre-notice information 1641 is not selected, the mobile terminal 100 can display a virtual icon related to the scheduled event on the home screen 1310 in a floating state. At this time, the virtual icon may have a maximum size or maximum resolution.

As shown in FIG. 17, when the pre-notice information 1641 displayed on the notice screen 1640 is selected, the mobile terminal 100 can display the pre-notice screen 1650 on the display unit 151. At this time, the pre-notice screen 1650 may further include alarm power on mode menu 1655. When the alarm power on mode menu 1655 of the pre-notice screen 1650 is selected, the mobile terminal 100 can display a popup window 1660 including an automatic power off item 1661 and a manual power off item 1662 on the display unit 151.

The automatic power off item refers to an item for setting an operation mode for automatically powering the mobile terminal 100 off and automatically booting the terminal system upon reaching the event time and providing alarm information. The manual power off item refers to an item for setting an operation mode for manually powering the mobile terminal 100 off and automatically booting the terminal system upon reaching the event time and providing alarm information.

When the automatic power off item 1661 is selected in the popup window 1660, the mobile terminal 100 can calculate a time remaining until the event time or the notice time, set a flag to perform automatic booting after the calculated time and ring only an alarm, and then automatically power the terminal system off.

When the manual power off item 1662 is selected in the popup window 1660, the mobile terminal 100 can calculate a time remaining until the event time or the notice time when a power button is pressed, set a flag to perform automatic booting after the calculated time and ring only an alarm, and then automatically power the terminal system off. When the alarm power on mode is set, the mobile terminal 100 can perform a minimum booting process without full booting and then generate an alarm event, upon reaching the event time or the alarm time.

Figure 18:
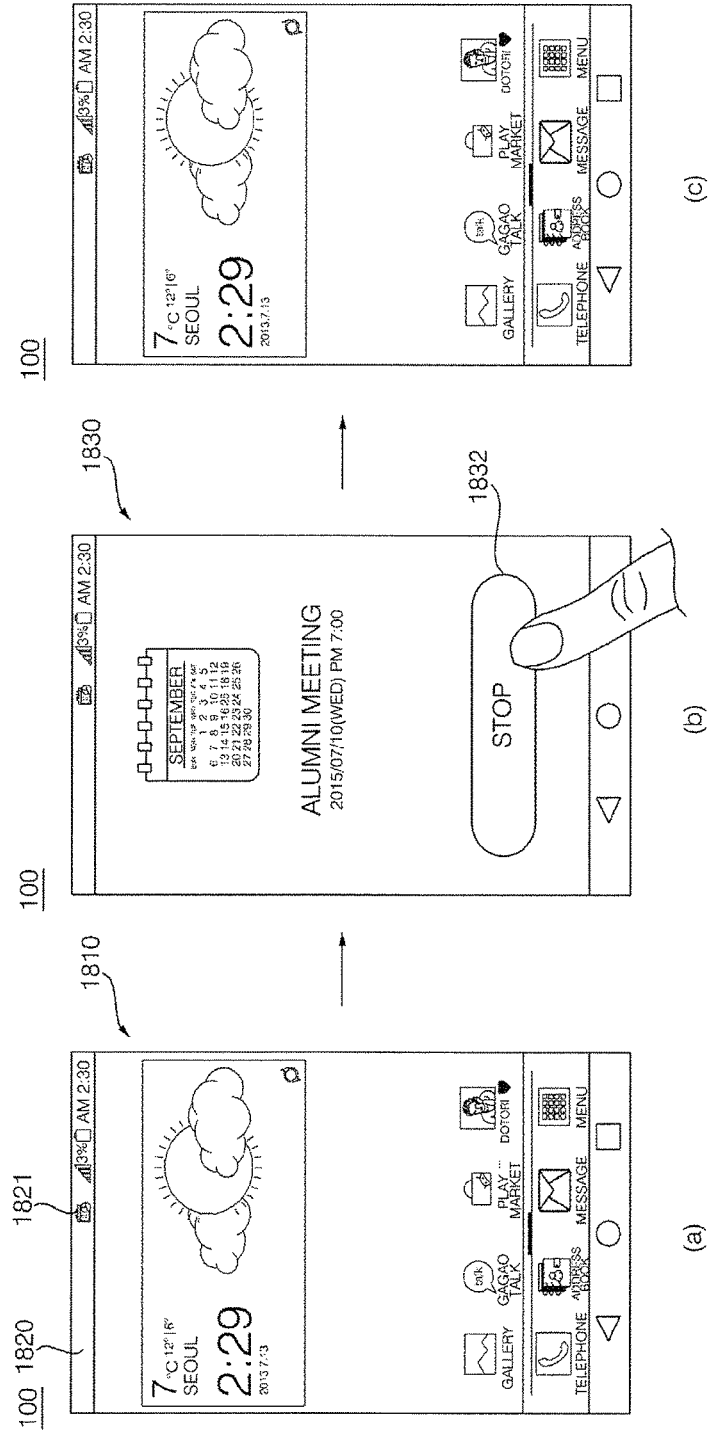
FIG. 18 is a view illustrating operation of a mobile terminal for generating a pre-notice event corresponding to a fourth step when a remaining battery power reaches a fourth threshold.

FIG. 18 is a view illustrating operation of a mobile terminal for generating a pre-notice event corresponding to a fourth step when a remaining battery power reaches a fourth threshold. Referring to FIG. 18, the mobile terminal 100 can periodically measure the remaining battery power and determine whether the remaining battery power reaches the fourth threshold. Hereinafter, in the present embodiment, the fourth threshold may be set to 3%, without being limited thereto.

Upon determining that the remaining battery power reaches the fourth threshold, the mobile terminal 100 can generate the pre-notice event corresponding to the fourth step. That is, the mobile terminal 100 can provide the pre-notice events corresponding to the first to third steps and an additional notice event.

The mobile terminal 100 can display a pre-notice icon 1821 indicating that there is a scheduled event upcoming after the battery is discharged on the status bar 1820 of the home screen 1810, upon reaching the fourth threshold. When the pre-notice icon displayed on the status bar does not disappear in the previous steps, the mobile terminal 100 can maintain the display of the pre-notice icon and output only a predetermined sound or haptic signal.

Upon reaching the fourth threshold, the mobile terminal 100 can generate the same notice event as the real notice event to be generated upon reaching the event time or the notice time. That is, the mobile terminal 100 can display an alarm screen 1830 shown in FIG. 18(b) on the display unit 151. At this time, the alarm screen 1830 may include information 1831 on the scheduled event and a stop icon 1832. When the stop icon 1832 is selected, the mobile terminal 100 can display the home screen 1810, which is a previous screen, on the display unit 151 again.

In addition, when user input of touching the upper end of the display unit 151 and dragging downward is received in a state of displaying the home screen 1810, the mobile terminal 100 can display a notice screen on the display unit 151. At this time, the notice screen may include pre-notice information corresponding to the pre-notice icon 1821 and a delete menu. Without setting the fourth threshold, when the remaining battery power reaches the third threshold, the same notice event as the notice event generated upon reaching the event time may occur.

Figure 19:
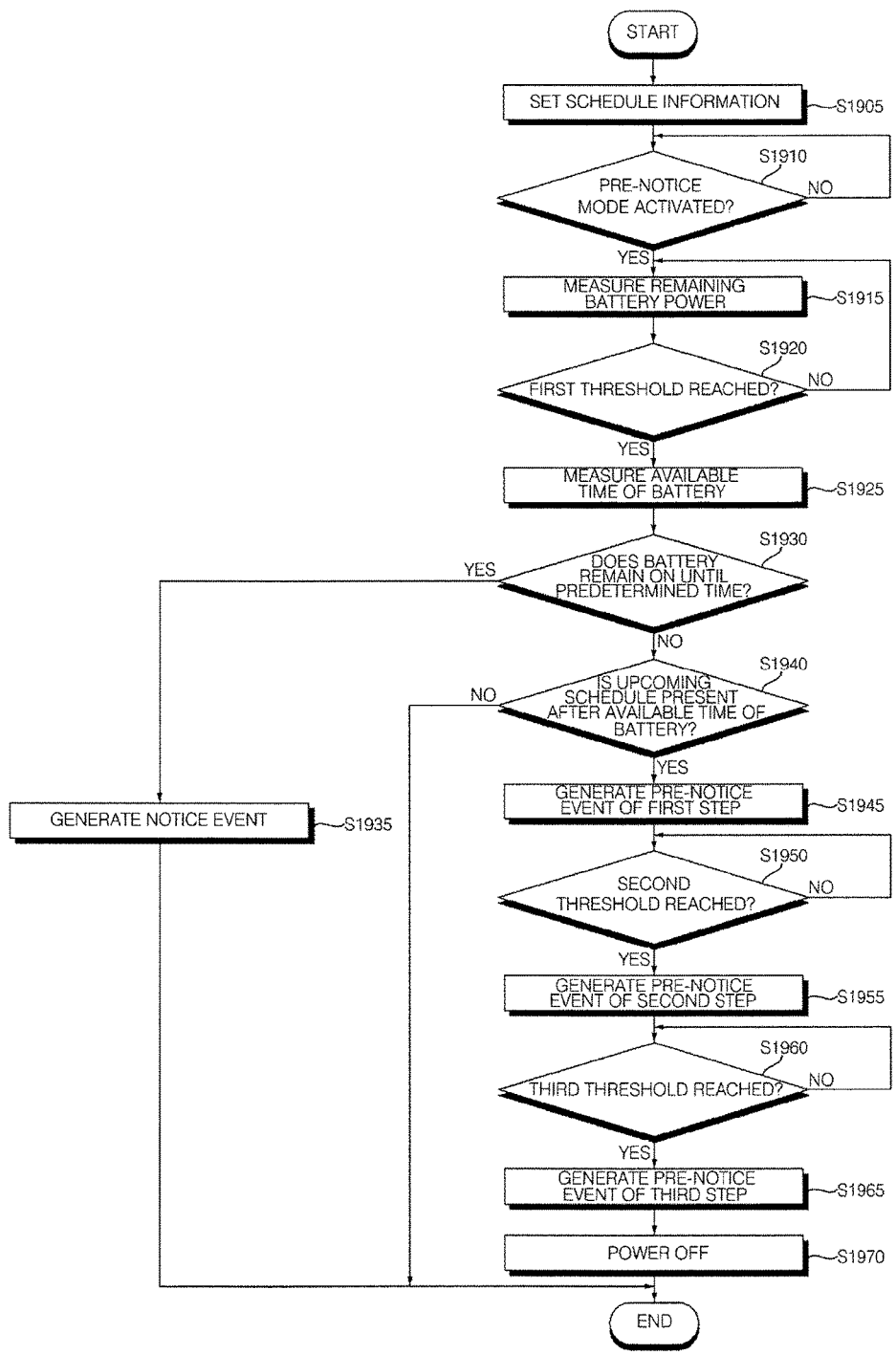
FIG. 19 is a flowchart illustrating operation of a mobile terminal according to another embodiment of the present invention.

FIG. 19 is a flowchart illustrating operation of a mobile terminal 100 according to another embodiment of the present invention. Referring to FIG. 19, the controller 180 executes a schedule application according to a user command and sets schedule information of a user (S1905). At this time, the schedule information may include an event title, an event place, an event time (event start and end times), a notice time, a participant, other detailed information, etc.

The controller 180 can check (or determine) whether a pre-notice mode (or a preliminary alarm mode) of the schedule information is activated, upon setting the schedule information (S1910). The pre-notice mode refers to an operation mode for pre-notifying a user of information on a major event when a remaining battery power is insufficient.

In addition, the controller 180 can check whether the pre-notice mode is collectively activated with respect to all scheduled events, based on user input for an entire settings menu or a schedule settings menu. If it is checked that the pre-notice mode is activated with respect to an individual scheduled event or all scheduled events in step S1910, the controller 180 periodically measures the remaining battery power (S1915). The controller 180 checks whether the periodically checked remaining battery power reaches a predetermined first threshold (S1920).

Upon checking that the remaining battery power reaches the first threshold in step S1920, the controller 180 measures a remaining time of the battery based on the measured remaining battery power and the overall load of the terminal system (S1925). Upon checking that the battery remains on until the event time or the notice time (S1930), the controller 180 generates a normal notice event when the event time or the notice time is reached (S1935). That is, the controller 180 does not provide the pre-notice service according to an embodiment of the present invention.

When the battery cannot remain on until the event time or the notice time (S1930), the controller 180 checks whether there is a scheduled event upcoming after the remaining time of the battery (S1940). As another embodiment, the controller 180 can check whether there is a scheduled event existing within a predetermined time after the remaining time of the battery.

Upon checking that there is a scheduled event upcoming after the remaining time of the battery (S1940), the controller 180 can generate a pre-notice event corresponding to a first step (S1945). At this time, the controller 180 can output a predetermined audio signal or haptic signal in correspondence with the first step.

Upon checking that the remaining battery power reaches a second threshold less than the first threshold (S1950), the controller 180 generates a pre-notice event corresponding to a second step having discrimination power higher than that of the first step (S1955). At this time, the controller 180 can output a predetermined audio signal or haptic signal in correspondence with the second step.

Upon checking that the remaining battery power reaches a third threshold less than the second threshold (S1960), the controller 180 generates a pre-notice event corresponding to a third step having discrimination power higher than that of the second step (S1965). At this time, the controller 180 can output a predetermined audio signal or haptic signal in correspondence with the third step.

The controller 180 powers the mobile terminal 100 off when the battery is discharged (S1970). Thereafter, when the battery is charged and the mobile terminal 100 is powered on again, the controller 180 can display information on a scheduled event set during the power off period on the display unit 151.

Although the state of the battery is divided into three steps and different pre-notice services are provided according to step in the present embodiment, the present invention is not limited thereto. Accordingly, it will be apparent to those skilled in the art that the state of the battery may be divided into more or less than three steps and pre-notice services corresponding to the steps may be provided.

As described above, the mobile terminal according to another embodiment of the present invention provides the pre-notice event for the preset scheduled event or alarm using various methods according to the state of the battery when the remaining battery power is insufficient, thereby preventing the user from missing the major event or alarm when the mobile terminal is powered off due to battery discharge.

As another embodiment, the mobile terminal 100 can not provide the pre-notice event when a predetermined exceptional condition is satisfied even when the remaining battery power reaches a predetermined threshold. At this time, the exceptional condition may include exception according to participant checking, exception according to a current position, exception according to battery charging, without being limited thereto.

When the remaining battery power reaches the predetermined threshold, the mobile terminal 100 can check whether a mobile terminal of at least one of the participants registered for the scheduled event is present near the mobile terminal 100. Upon checking that at least one of the participants is present near the mobile terminal 100, the mobile terminal 100 can not provide the pre-notice event according to the state of the battery.

When the remaining battery power reaches the predetermined threshold, the mobile terminal 100 can check whether the current position of the user is identical to an event place registered for the scheduled event. Upon checking that the user is positioned at the event place, the mobile terminal 100 can not provide the pre-notice event according to the state of the battery.

When the remaining battery power reaches the predetermined threshold, the mobile terminal 100 can check whether the mobile terminal of the user enters the charging mode to increase the remaining battery power. Upon checking that the remaining battery power increases, the mobile terminal 100 can not provide the pre-notice event according to the state of the battery.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal comprising:
a wireless communication unit configured to provide wireless communication;
a display;
a battery configured to supply power to the mobile terminal; and
a controller configured to:
measure a remaining charge of the battery when a pre-notice mode is activated,
measure an available time of the battery based on the measured remaining charge of the battery and a load of the mobile terminal, and
output a predetermined pre-notice event when an upcoming scheduled event is present after the available time,
wherein the pre-notice mode is activated via an input for an item for setting the pre-notice mode included in a schedule setting screen for inputting a new event,
wherein the schedule setting screen is displayed when a new schedule menu is selected, and
wherein the controller is further configured to determine a priority of the scheduled event by using a schedule information input through the schedule setting screen, and as the priority of the scheduled event increases, increase a threshold of a remaining battery power corresponding to a condition for occurring of the pre-notice event.

2. The mobile terminal according to claim 1, wherein the controller is further configured to receive preset schedule information according to a user input.

3. The mobile terminal according to claim 1, wherein the controller is further configured to:
check whether a specific time when the pre-notice event can be generated is reached based on a predetermined schedule time and a pre-notice time, and
measure the remaining charge of the battery when the specific time is reached.

4. The mobile terminal according to claim 3, wherein the pre-notice time is set by a user upon setting schedule information, upon setting a pre-notice alarm mode or is set by default by a manufacturer of the mobile terminal.

5. The mobile terminal according to claim 1, wherein the controller is further configured to output the pre-notice event when the measured remaining charge of the battery reaches a predetermined threshold.

6. The mobile terminal according to claim 1, wherein the controller is further configured to display, on a status bar of the display, a pre-notice icon indicating that the upcoming scheduled event is present after the available time.

7. The mobile terminal according to claim 6, wherein the controller is further configured to display, on the display, a pre-notice screen including information on a scheduled event to be pre-notified and an operation option of a user related to pre-notice, in response to pre-notice information corresponding to the pre-notice icon being selected.

8. The mobile terminal according to claim 1, wherein the controller is further configured to output pre-notice events having different levels according to a state of the battery.

9. The mobile terminal according to claim 1, wherein the controller is further configured to output the predetermined pre-notice event when an upcoming alarm is present after the available time.

10. A method of controlling a mobile terminal, the method comprising:
supplying, via a battery of the mobile terminal, power to the mobile terminal;
measuring, via a controller of the mobile terminal, a remaining charge of the battery when a pre-notice mode is activated;
measuring, via the controller, an available time of the battery based on the measured remaining charge of the battery and a load of the mobile terminal; and
outputting, via the controller, a predetermined pre-notice event when an upcoming scheduled event is present after the available time,
wherein the pre-notice mode is activated via an input for an item for setting the pre-notice mode included in a schedule setting screen for inputting a new event,
wherein the schedule setting screen is displayed when a new schedule menu is selected, and
wherein the method further comprises determining a priority of the scheduled event by using a schedule information input through the schedule setting screen, and as the priority of the scheduled event increases, increasing a threshold of a remaining battery power corresponding to a condition for occurring of the pre-notice event.

11. The method according to claim 10, further comprising:
receiving preset schedule information according to a user input.

12. The method according to claim 10, further comprising:
checking whether a specific time when the pre-notice event can be generated is reached based on a predetermined schedule time and a pre-notice time; and
measuring the remaining charge of the battery when the specific time is reached.

13. The method according to claim 12, wherein the pre-notice time is set by a user upon setting schedule information, upon setting a pre-notice alarm mode or is set by default by a manufacturer of the mobile terminal.

14. The method according to claim 10, further comprising:
outputting the pre-notice event when the measured remaining charge of the battery reaches a predetermined threshold.

15. The method according to claim 10, further comprising:
displaying, on a status bar of a display of the mobile terminal, a pre-notice icon indicating that the upcoming scheduled event is present after the available time.

16. The method according to claim 15, further comprising:
displaying, on the display, a pre-notice screen including information on a scheduled event to be pre-notified and an operation option of a user related to pre-notice, in response to pre-notice information corresponding to the pre-notice icon being selected.

17. The method according to claim 10, further comprising:
output pre-notice events having different levels according to a state of the battery.

18. The method according to claim 10, further comprising:
outputting the predetermined pre-notice event when an upcoming alarm is present after the available time.

* * * * *